US012202156B2

(12) United States Patent
Bozikis

(10) Patent No.: US 12,202,156 B2
(45) Date of Patent: Jan. 21, 2025

(54) RAZOR CARTRIDGE

(71) Applicant: Bic Violex S.A., Anoixi (GR)

(72) Inventor: Ioannis Bozikis, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 519 days.

(21) Appl. No.: 17/426,295

(22) PCT Filed: Jan. 30, 2020

(86) PCT No.: PCT/EP2020/052239
§ 371 (c)(1),
(2) Date: Jul. 28, 2021

(87) PCT Pub. No.: WO2020/157173
PCT Pub. Date: Aug. 6, 2020

(65) Prior Publication Data

US 2022/0088809 A1 Mar. 24, 2022

(30) Foreign Application Priority Data

Jan. 31, 2019 (EP) .................................... 19154897
May 31, 2019 (EP) .................................... 19177659
May 31, 2019 (EP) .................................... 19177663

(51) Int. Cl.
*B26B 21/40* (2006.01)
*B26B 21/22* (2006.01)
(Continued)

(52) U.S. Cl.
CPC .......... *B26B 21/4031* (2013.01); *B26B 21/22* (2013.01); *B26B 21/4068* (2013.01);
(Continued)

(58) Field of Classification Search
CPC . B26B 21/4031; B26B 21/443; B26B 21/565; B26B 21/22; B26B 21/4046;
(Continued)

(56) References Cited

U.S. PATENT DOCUMENTS 4,335,508 A 6/1982 Francis et al.
5,426,851 A 6/1995 Gilder et al.
(Continued)

FOREIGN PATENT DOCUMENTS

CN 101808784 A 8/2010
CN 102655993 A 9/2012
(Continued)

OTHER PUBLICATIONS

International Search Report and Written Opinion in corresponding Application No. PCT/EP2020/052239, dated Mar. 30, 2020 (12 pages).
(Continued)

*Primary Examiner* — Ghassem Alie
(74) *Attorney, Agent, or Firm* — Bookoff McAndrews, PLLC

(57) ABSTRACT

A razor cartridge comprising three or more substantially parallel cutting members disposed between a leading longitudinal side and a trailing longitudinal side of the razor cartridge in a shaving direction of the razor cartridge. Each of the cutting members comprises a blade support comprising a blade mounting portion disposed on an inner surface of the respective blade support that, in use, faces away from a shaving plane, and a blade attached to the blade mounting portion. The cutting members are disposed to define a plurality of inter-blade spans between cutting edges of the blades. A leading inter-blade span that is closer to the leading longitudinal side of the razor cartridge than a trailing inter-blade span is different to the trailing inter-blade span that is
(Continued)

closer to the trailing longitudinal side of the razor cartridge than the leading inter-blade span.

16 Claims, 10 Drawing Sheets

(51) Int. Cl.
*B26B 21/52* (2006.01)
*B26B 21/56* (2006.01)
*B26B 21/06* (2006.01)
*B26B 21/44* (2006.01)

(52) U.S. Cl.
CPC .......... *B26B 21/521* (2013.01); *B26B 21/565* (2013.01); *B26B 21/06* (2013.01); *B26B 21/225* (2013.01); *B26B 21/443* (2013.01)

(58) Field of Classification Search
CPC .............. B26B 21/4012; B26B 21/227; B26B 21/521; B26B 21/06; B26B 21/225; B26B 21/4068; B26B 21/4018; B26B 21/4043
USPC ............................... 30/50, 77, 346.57, 346.5
See application file for complete search history.

(56) References Cited

U.S. PATENT DOCUMENTS

| | | | |
|---|---|---|---|
| 6,009,624 | A | 1/2000 | Apprille, Jr. et al. |
| 6,041,926 | A | 3/2000 | Petricca et al. |
| 6,161,287 | A | 12/2000 | Swanson et al. |
| 6,173,498 | B1 | 1/2001 | Warrick et al. |
| 6,212,777 | B1 | 4/2001 | Gilder et al. |
| 6,216,349 | B1 | 4/2001 | Gilder et al. |
| 6,295,734 | B1 | 10/2001 | Gilder et al. |
| 6,438,846 | B1 | 8/2002 | Alsaifi |
| 7,669,335 | B2 | 3/2010 | Walker et al. |
| 7,681,314 | B2 | 3/2010 | Follo |
| 8,117,753 | B2 | 2/2012 | Gilder et al. |
| 8,225,510 | B2 | 7/2012 | Peterson et al. |
| 9,032,628 | B2 | 5/2015 | Hobson, Sr. et al. |
| 9,718,200 | B2 | 8/2017 | Dryfhout |
| 9,937,629 | B1 | 4/2018 | Dryfhout |
| 10,493,643 | B1 | 12/2019 | Dryfhout |
| 10,780,595 | B2 | 9/2020 | Lin et al. |
| 10,780,598 | B2 * | 9/2020 | Park ........................ B26B 21/14 |
| 10,786,914 | B2 | 9/2020 | Galanis et al. |
| 10,981,286 | B2 | 4/2021 | Efthimiadis et al. |
| 11,000,960 | B1 | 5/2021 | Hooberman |
| 11,059,193 | B2 | 7/2021 | Bozikis |
| 11,691,306 | B2 | 7/2023 | Bozikis et al. |
| 2005/0015991 | A1 | 1/2005 | Follo et al. |
| 2005/0198825 | A1 | 9/2005 | Apprille, Jr. |
| 2005/0198837 | A1 * | 9/2005 | Rawle ................... B26B 21/565 30/50 |
| 2007/0193042 | A1 | 8/2007 | Worrick et al. |
| 2009/0083982 | A1 | 4/2009 | Forsdike |
| 2010/0077617 | A1 | 4/2010 | Peterson et al. |
| 2010/0175265 | A1 * | 7/2010 | Bozikis ............... B26B 21/4012 30/526 |
| 2010/0218381 | A1 | 9/2010 | Follo |
| 2010/0269351 | A1 | 10/2010 | Gilder et al. |
| 2011/0146079 | A1 | 6/2011 | Clarke et al. |
| 2011/0162208 | A1 * | 7/2011 | Wain ..................... B26B 21/521 30/84 |
| 2011/0289779 | A1 | 12/2011 | Volodin et al. |
| 2014/0026424 | A1 | 1/2014 | Oglesby et al. |
| 2014/0259677 | A1 | 9/2014 | Coresh |
| 2015/0101195 | A1 * | 4/2015 | Long ................... B26B 21/4018 30/41.5 |
| 2016/0040803 | A1 | 2/2016 | Steeger et al. |
| 2016/0167242 | A1 | 6/2016 | Noh et al. |
| 2017/0057106 | A1 | 3/2017 | Worrick, III |
| 2018/0001492 | A1 * | 1/2018 | Nicholas .................. B41J 3/413 |
| 2018/0071930 | A1 | 5/2018 | Walker, Jr. et al. |
| 2019/0016001 | A1 | 1/2019 | Zucker |
| 2019/0061184 | A1 | 2/2019 | Lin et al. |
| 2019/0224874 | A1 | 7/2019 | Blatter et al. |
| 2020/0031005 | A1 | 1/2020 | Kim et al. |
| 2020/0031006 | A1 * | 1/2020 | Kim .................... B26B 21/4031 |
| 2020/0316801 | A1 | 10/2020 | Efthimiadis et al. |
| 2021/0031389 | A1 | 2/2021 | Bozikis et al. |
| 2021/0146561 | A1 | 5/2021 | Bozikis et al. |
| 2021/0370534 | A1 | 12/2021 | Bozikis |
| 2022/0118635 | A1 | 4/2022 | Bozikis et al. |
| 2022/0152853 | A1 | 5/2022 | Moustakas |
| 2022/0234228 | A1 | 7/2022 | Zografos et al. |
| 2022/0314476 | A1 | 10/2022 | Zografos et al. |
| 2022/0314477 | A1 | 10/2022 | Galanis et al. |
| 2022/0314478 | A1 | 10/2022 | Galanis |

FOREIGN PATENT DOCUMENTS

| | | | | |
|---|---|---|---|---|
| CN | 103180110 | A | 6/2013 | |
| CN | 105358294 | A | 2/2016 | |
| CN | 109153140 | A | 1/2019 | |
| EP | 2823942 | A1 | 1/2015 | |
| EP | 2731759 | B1 | 12/2015 | |
| EP | 2707180 | B1 | 12/2016 | |
| EP | 3357653 | A1 * | 8/2018 | ............. B26B 21/22 |
| JP | 5719755 | B2 | 5/2015 | |
| JP | 6719755 | B2 | 5/2015 | |
| WO | WO-9509071 | A1 * | 4/1995 | ........... B26B 21/222 |
| WO | 2006027018 | A1 | 3/2006 | |
| WO | 2008023210 | A1 | 2/2008 | |
| WO | 2011092891 | A1 | 8/2011 | |
| WO | WO-2012158141 | A1 * | 11/2012 | ........... B26B 21/227 |
| WO | 2016007329 | A1 | 1/2016 | |

OTHER PUBLICATIONS

First Search issued in corresponding Chinese Application No. 113226675A, issued Oct. 8, 2022.
First Search issued in corresponding Chinese Application No. 2020800070332, issued Aug. 16, 2022.

* cited by examiner

RAZOR CARTRIDGE

This application is a 371 National Phase of and claims the benefit of priority to Application No. PCT/EP2020/052239, filed on Jan. 30, 2020, now published as WO2020157173, which claims benefit from European patent applications EP19154897.3, filed on 31 Jan. 2019, EP19177659.0, filed on 31 May 2019, and EP19177663.2, filed on 31 May 2019, their content being incorporated herein by reference.

The embodiments described in the following disclosure relate to a razor cartridge, a method for manufacturing a razor cartridge, a shaving razor assembly and an associated kit of parts.

BACKGROUND

Razor cartridges (also known as safety razor cartridges) are permanently or removably attached to a razor handle that, in use, is oriented in shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). A skin care element is also often provided at the trailing longitudinal side. In use, a user holds the razor handle in the shaving direction and brings the razor cartridge into contact with a portion of skin defining a shaving plane.

Typically, the shaving plane is defined as the tangential line intersecting the first and second skin contact points of, for example, cutting edges of the shaving head. More simply, the shaving plane may be approximated as a line between the highest points on the skin-contacting surfaced of a razor cartridge—for example, the flat plane between the top of a guard and the top of a cap of the shaving head. Movement of the razor handle causes the blades of the razor cartridge to be moved across the shaving plane in the shaving direction, enabling the blades to remove unwanted hair.

The performance of razor cartridges may be further improved.

SUMMARY

According to a first aspect, a razor cartridge is provided. The razor cartridge comprises three or more substantially parallel cutting members disposed between a leading longitudinal side, and a trailing longitudinal side of the razor cartridge in a shaving direction of the razor cartridge.

Each of the cutting members comprises a blade support comprising a blade mounting portion disposed on an inner surface of the respective blade support that, in use, faces away from a shaving plane SH (shaving surface), and a blade attached to the blade mounting portion.

The cutting members are disposed to define a plurality of inter-blade spans between cutting edges of the blades.

A leading inter-blade span that is closer to the leading longitudinal side of the razor cartridge than a trailing inter-blade span is different to the trailing inter-blade span that is closer to the trailing longitudinal side of the razor cartridge than the leading inter-blade span.

In embodiments, a leading inter-blade span that is closer to the leading longitudinal side of the razor cartridge than a trailing inter-blade span is smaller than the trailing inter-blade span that is closer to the trailing longitudinal side of the razor cartridge than the leading inter-blade span.

In embodiments, a leading inter-blade span that is closer to the leading longitudinal side of the razor cartridge than a trailing inter-blade span is greater than the trailing inter-blade span that is closer to the trailing longitudinal side of the razor cartridge than the leading inter-blade span.

According to an example, a razor cartridge is provided. The razor cartridge comprises three or more substantially parallel cutting members disposed between a leading longitudinal side, and a trailing longitudinal side of the razor cartridge in a shaving direction of the razor cartridge.

Each of the cutting members comprises a blade support comprising a blade mounting portion disposed on an inner surface of the respective blade support that, in use, faces away from a shaving plane SH (shaving surface), and a blade attached to the blade mounting portion.

The cutting members are disposed to define a plurality of inter-blade spans between cutting edges of the blades.

In an example, a leading inter-blade span that is closer to the leading longitudinal side of the razor cartridge is different to a trailing inter-blade span that is closest to the trailing longitudinal side of the razor cartridge.

A leading inter-blade span that is closest to the leading longitudinal side of the razor cartridge is smaller than a trailing inter-blade span that is closest to the trailing longitudinal side of the razor cartridge.

In other examples, a leading inter-blade span that is closer to the leading longitudinal side of the razor cartridge is greater than a trailing inter-blade span that is closest to the trailing longitudinal side of the razor cartridge.

According to a second aspect, a method of manufacturing a razor cartridge comprises:

- obtaining a razor cartridge housing, and three or more cutting members, wherein each of the cutting members comprises a blade support comprising a blade mounting portion disposed on an inner surface of the respective blade support that in use faces away from a shaving plane SH and a blade attached to the blade mounting portion; and
- disposing the cutting members between a leading longitudinal side and a trailing longitudinal side of the razor cartridge housing in a shaving direction of the razor cartridge, wherein in use, the inner surface of the respective blade support faces away from a shaving plane SH.

The cutting members define a plurality of inter-blade spans between cutting edges of the blades.

A leading inter-blade span that is closer to the leading longitudinal side of the razor cartridge is different to a trailing inter-blade span that is closer to the trailing longitudinal side of the razor cartridge.

According to a third aspect, there is provided a shaving razor assembly comprising:

- a razor handle; and
- a razor cartridge according to the first aspect. The razor cartridge is either releasably attached to the razor handle via a pivotable, or non-pivotable connection, integrally formed with the razor handle via a non-pivotable connection, or is integrally formed with the razor handle via a pivotable connection.

In an example, the razor handle may be re-used by changing the razor cartridge, or the razor cartridge is fixedly attached to the razor handle, via a pivotable, or non-pivotable connection.

According to a fourth aspect, there is provided a kit of parts, comprising a razor handle and a razor cartridge holder comprising a plurality of razor cartridges according to the first aspect.

Further embodiments are presented in the dependent claims, and the detailed description, to which the reader should now refer.

An effect of a razor cartridge according to these aspects is that when shaving, the blade supports of the cutting members are brought into contact with the skin (shaving plane) in addition to the cutting edges of the blade. Therefore, the number of contact points between the razor cartridge and the skin is increased, up to being doubled. The amount of pressure exerted on a portion of skin by each cutting edge is significantly reduced, leading to fewer incidents of skin injury ("nicking") and a more comfortable shave.

The blade is mounted on an inner surface of the blade support to enable the blade support to simultaneously contact the skin at the same time as the cutting edge of the blade, in use. This means that the portions of the blade support in contact with the skin reduce or minimize the "skin bulge", thus reducing the risk of nicks and cuts occurring.

Another effect is that durability of the blades is prolonged, since less pressure is applied to the skin thus resulting in a less aggressive shaving and therefore the blades wear at a lower rate.

The provision of a smaller to larger variable inter-blade span from the leading longitudinal side to the trailing longitudinal side of the razor cartridge means a less aggressive and smoother shaving, thus resulting in the user suffering from fewer nicks and cuts and skin irritation. A smaller inter-blade span towards the leading longitudinal side of the razor cartridge enhances glideness of the shaver along the shaving plane and improves the support of the skin at the leading edge of the razor cartridge with the same number of blades as compared to a conventional razor.

This makes the razor cartridge suitable for frequent (daily) shavers. Daily shavers do not need to remove such a large amount of hair compared to infrequent shavers. Therefore, a large gap in proximity to the leading edge of the razor cartridge is less important for frequent shavers. However, the advantages of the skin support concept using blades mounted on an inner surface of the blade support still enables a shave having better glideness. And this effect is provided at the same time that the rinsability of the cartridge is enhanced owing to the increased gap in proximity to the trailing edge of the razor cartridge.

In an example where the leading inter-blade span between cutting edges towards the leading longitudinal side of the razor cartridge is greater than a trailing inter-blade span between cutting edges towards the trailing longitudinal side of the razor cartridge, another effect is that the larger gap between the cutting members at the leading longitudinal side of the razor cartridge enables more removed hair to pass through, and a greater flow of debris and foam during shaving as well as a greater degree of rinsability. Infrequent razor users wait several days between shaving, leading to a requirement for a greater degree of hair removal compared to the case of a user who shaves daily. Therefore, a razor cartridge according to this example is better adapted to users who shave less frequently, because the increased inter-blade span (or spans) towards the leading longitudinal edge of the razor cartridge can accommodate the denser and/or longer hair clippings characteristic of users who shave less frequently.

An inter blade span is defined, in an example, with reference to a plane intersecting the cutting edges of at least two blades of a razor cartridge. A line between the cutting edges of first and second blades and perpendicular to the first and second cutting edges is an inter blade span (or space). In the following application, the fact that a first inter-blade span and a second inter-blade span are "different" to each other means that a first distance defining the first inter-blade span in the transverse direction of the razor cartridge, and a second distance defining the second inter-blade span in the transverse direction of the razor cartridge have a different length. In other words, the first distance is, in an example, greater than the second distance. In another example, the first distance is smaller than the second distance. In other words, a first distance defining the parallel separation of the first inter-blade span is greater than, or smaller than, a second distance defining the parallel separation of the second inter-blade span.

In general, a razor cartridge according to the present specification provides a razor cartridge wherein each of the cutting members comprises a blade support comprising a blade mounting portion disposed on an inner surface of the respective blade support that, in use, faces away from a shaving plane, where the inter-blade spacing may be customized to provide a range of razor cartridges to suit a variety of shaving habits.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
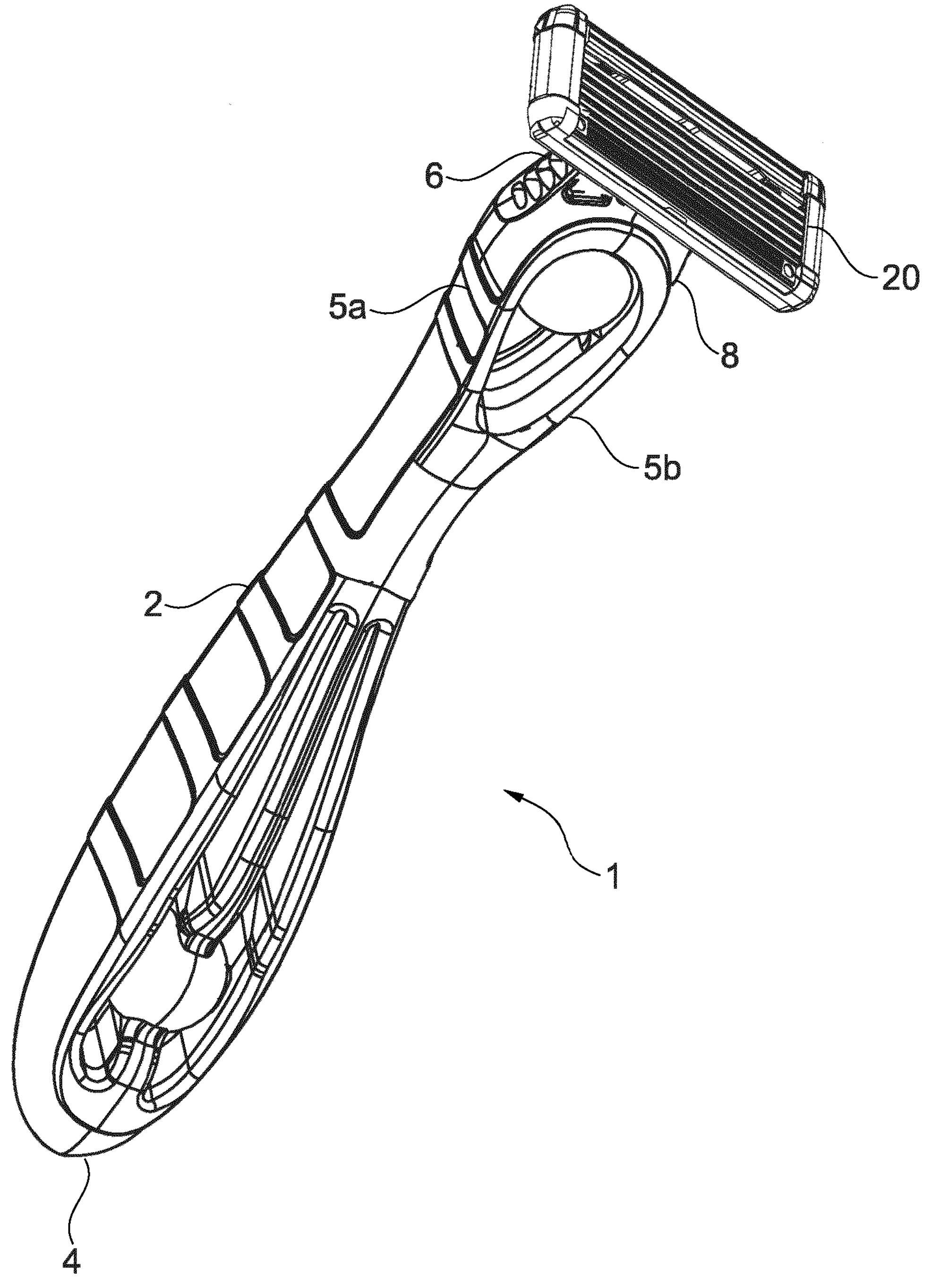
FIG. 1 is a perspective view of a shaving razor assembly.

FIG. 1 is a perspective view of a shaving razor assembly 1 according to an aspect. The shaving razor assembly comprises blades which are not driven by a motor. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be presented in more detail following discussion of the shaving razor assembly 1.

The mounting of the razor cartridge 20 to the distal portion 6 of the handle 2 in the illustration is via a pivotable bearing member 8*a* enabling a frame of reference of the handle 2 to vary relative to a frame of reference of the razor cartridge 20, to thus enable the angle of the razor cartridge against the skin of a user to vary and adapt to changes during use.

In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Another example of a connection mechanism for connecting the razor cartridge 20 to the handle 2 is discussed in WO2006/027018 A1. Another alternative is a razor cartridge 20 that may pivot relative to a second pivot axis (a rocking axis), substantially perpendicular to axis L.

In examples, the pivotable bearing member 8*a* may be omitted (not illustrated) and the handle 2 provided as an integrally connected part of the support of the razor cartridge 20. In an example, the pivotable bearing member 8*a* may further comprise, or be replaced by, a release mechanism 5*a*, 5*b*, enabling rapid release of an exhausted razor cartridge from the handle 2.

In an example, the handle 2 and the support of the razor cartridge 20 are integrally formed with a pivotable bearing member (not illustrated) such as a plastic spring member.

In an example, the handle 2 is provided with a handle grip 9 formed of a rubber, or rubber-like material to improve gripping friction. In an example, the handle is provided with a thumb-rest to enable a more secure grip of the handle 2 by a user.

Figure 2A:
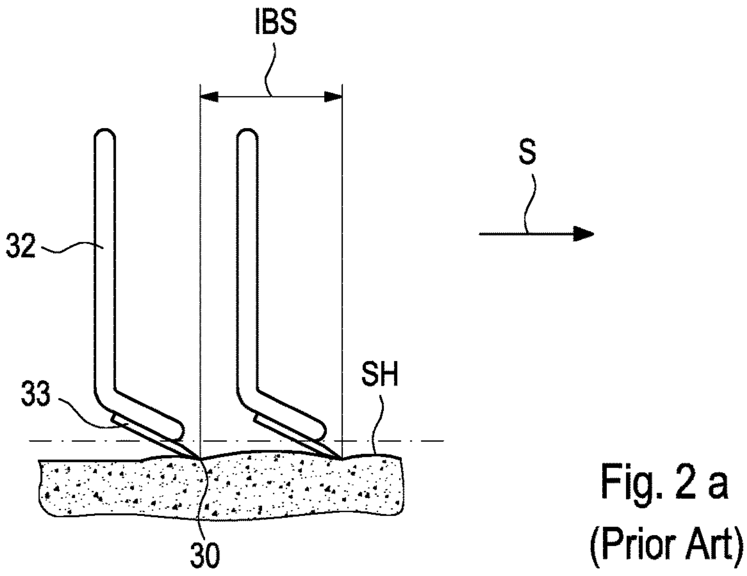
Fig. 2 a (Prior Art)
FIGS. 2*a* and 2*b* show schematic side views of a portion of a prior art razor cartridge in use.
Figure 2B:
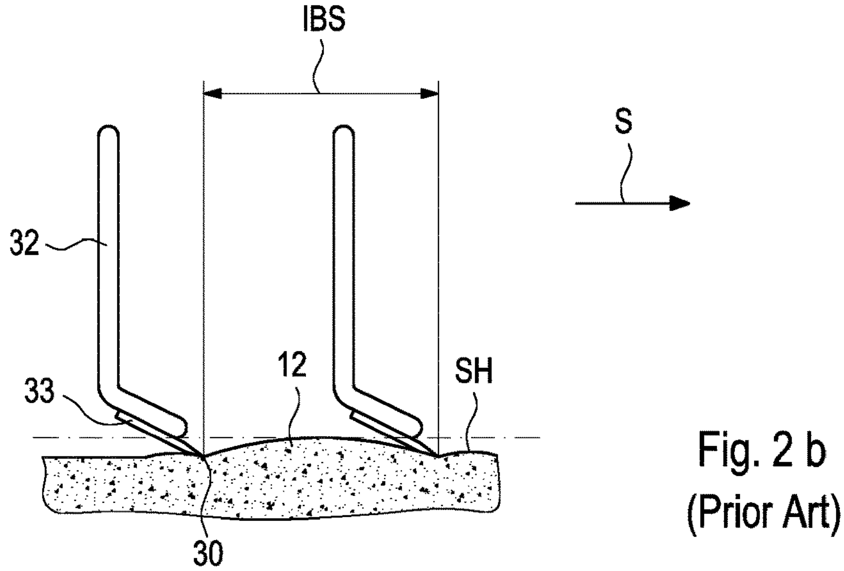
Fig. 2 b (Prior Art)

FIGS. 2*a* and 2*b* are schematic side views of a portion of a prior art razor cartridge in use. In conventional razor cartridges with three or more blades, the inter-blade span is measured to be constant in a range of about 1.05 mm to 1.5 mm, and the razor blade is mounted on the top of the blade support.

The phrase "top of the blade support" for the purposes of this specification means a side of a blade support of a razor cartridge that is closest to a shaving plane SH (skin) of a user when the razor cartridge is in use, as illustrated in FIGS. 2*a* and 2*b*. When a razor cartridge with such top-mounted cutting members is used, aggressive shaving may result in an increased degree of nicks and cuts and an increased sense of irritation, because the shaving plane SH (skin) is exclusively supported by the cutting edges 30 of the blades on the blade support. This provides the skin with a relatively small surface to be supported on during shaving, and causes an increased degree of "bulging" 12 of the shaving plane SH (skin) between the inter-blade gaps.

Figure 3:
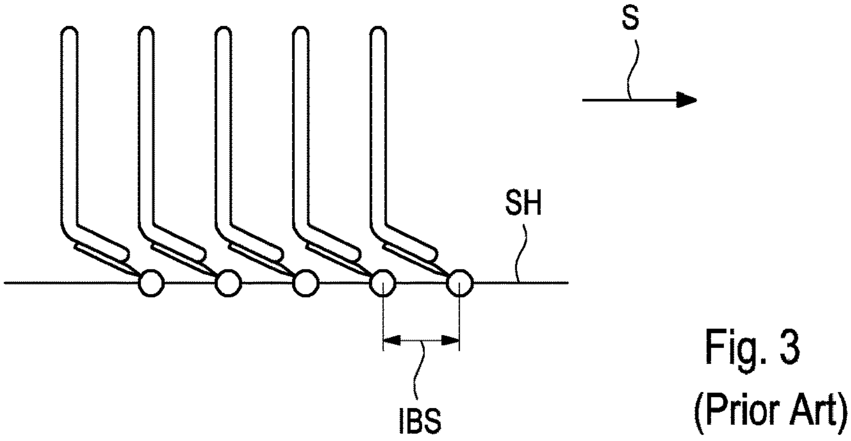
Fig. 3 (Prior Art)
FIG. 3 is a schematic side view of a portion of a prior art razor cartridge in use.

FIG. 3 is a schematic side view of a portion of a prior art razor cartridge in use. To reduce the effect of skin bulging 12, the inter-blade span IBS can be reduced, as illustrated in FIG. 3. However, this results in a reduced gap for rinsing, and debris such as foam or hair can easily block a gap having a narrow inter-blade span. A greater blade density (number of blades in the same-sized cartridge) is also required when the IBS between all blades is reduced.

According to a first aspect, there is provided a razor cartridge 20 comprising: three or more substantially parallel cutting members disposed between a leading longitudinal side 24 and a trailing longitudinal side 25 of the razor cartridge in a shaving direction of the razor cartridge.

Each of the cutting members comprises a blade support comprising a blade mounting portion disposed on an inner surface of the respective blade support that, in use, faces away from a shaving plane SH, and a blade attached to the blade mounting portion.

The cutting members are disposed to define a plurality of inter-blade spans between cutting edges 30 of the blades.

A leading inter-blade span that is closest to the leading longitudinal side 24 of the razor cartridge is different to a trailing inter-blade span that is closest to the trailing longitudinal side 25 of the razor cartridge.

In other words, according to different examples, the leading inter-blade span is smaller than, or greater than, the trailing inter-blade span. The following disclosure discusses different examples in which the leading inter-blade span is greater than, or smaller than, the trailing inter-blade span.

Figure 4:
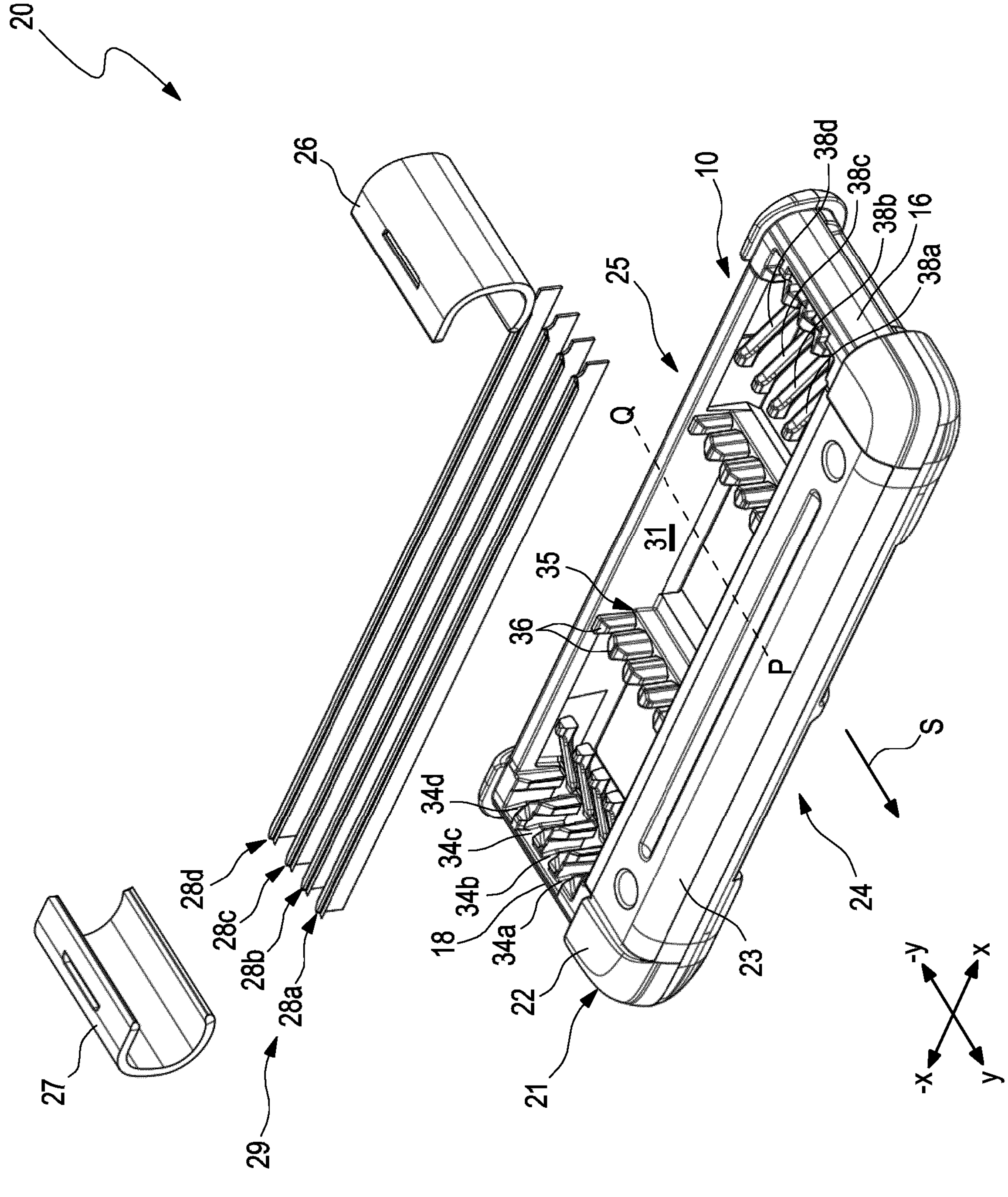
FIG. 4 is a perspective partial exploded view of a razor cartridge.

FIG. 4 is a perspective partial exploded view of a razor cartridge 20 according to an example of the first aspect in which the leading inter-blade span is greater than the trailing inter-blade span. "Partial exploded view" means that some minor components of the razor cartridge 20 have been omitted from the exploded view to aid clarity of the drawing.

The shaving direction S is depicted in FIG. 4 using arrow S. In use, the razor cartridge 20 contacts a shaving plane SH (not shown in FIG. 4), and is translated across the shaving plane SH in the direction of arrow S.

A frame 21 may be fabricated partially or completely of synthetic materials, such as plastic, resin, or elastomers. The frame 21 comprises a platform member 22 connectable to a handle 2 of a shaving razor assembly 1 either integrally, or by a connection mechanism such as a pivotable bearing member 8*a* or by an interconnecting member (not shown).

A guard member 23 is provided as a substantially longitudinal edge of the razor cartridge 20. In use, the guard member 23 is the first portion of the razor cartridge 20 to contact uncut hairs, and it is thus located at a leading longitudinal side 24 of the razor cartridge 20. The side of the razor cartridge 20 opposite to the leading longitudinal side of the razor cartridge 20 and opposite to the shaving direction is the trailing longitudinal side 25 of the razor cartridge 20. The trailing longitudinal side 25 is thus the final portion of the razor cartridge 20 to contact the shaving plane SH, in use.

It will be noted that the terms "leading longitudinal side 24" and "trailing longitudinal side 25" are used to denote specific locations on the razor cartridge 20, and do not imply or require the absence or presence of a particular feature. For example, a guard member 23 may in one example be located at the "leading longitudinal side 24", and in another example a trimming blade (not shown in FIG. 4) may be located at the "trailing longitudinal side 25" in another example, but it is not essential that these locations comprise such features.

The guard member 23, in an example, comprises an elastomeric member (not shown in FIG. 4). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The razor cartridge 20 may, in embodiments, further comprise a cap member at, or near to, the trailing longitudinal side 25 but this is not illustrated in the embodiment of FIG. 4 as an aid to clarity.

The razor cartridge 20 further comprises a group of cutting members 29 accommodated in a blade receiving section 31 of the frame 21. The group of cutting members 29 comprises a plurality of cutting members 28*a-d*. The group of cutting members 29 is disposed in the frame 21 longitudinally and parallel to the shaving direction SH such that in use, blades of the cutting members 28*a-d* contact a shaving plane SH and cut hair present on the shaving plane SH as the razor cartridge 20 is moved across the shaving plane SH in the shaving direction S. The particular design of the group cutting members 29 will be discussed in detail subsequently.

In an example, a razor cartridge is provided with three cutting members. In an example, a razor cartridge is provided with four cutting members. In an example, a razor cartridge is provided with five cutting members. In an example, a razor cartridge is provided with six cutting members. In an example, a razor cartridge is provided with seven or more cutting members.

The group of cutting members 29 defines a plurality of substantially parallel inter-blade spans. The number of inter-blade spans is one fewer than the number of cutting members.

The frame 21 further comprises first retainer 26 and second retainer 27 configured to hold the razor blades within razor cartridge 20 housing. The frame 21 further comprises first 16 and second 18 side portions. When the razor cartridge 20 is in an assembled state, the first and second side portions 16, 18 are configured to fixedly confine the longitudinal ends of the guard member 23, a cap member 29 (if present, not shown in FIG. 4) and the group of cutting members 29. The first side retainer 26 and second retainer 27 may comprise, for example, plastic, an elastomer, or a metal material and furthermore may be of a different shape to that illustrated.

Although not illustrated, a pivotable bearing member 8*b* may, in an example be provided on the side of the razor cartridge 20 configured to connect to a pivotable handle 2. Such a pivotable bearing member 8*b*, in an example, comprises two or more shell bearings configured to connect to the pivotable bearing member 8*a* of the handle 2.

The cutting members comprised in the group of cutting members 29 are disposed in the razor cartridge such that two cutting edges 30 comprised, respectively, on the two foremost (nearest to the leading side of the razor cartridge) cutting members of the group of cutting members 29 define a leading inter-blade span that is closest to the leading longitudinal side 24 of the razor cartridge 20 and that is greater than a trailing inter-blade span defined between the two cutting edges that are closest to the trailing longitudinal side 25 of the razor cartridge in the variant illustrated in FIG. 4. The inter-blade spans are illustrated further in FIG. 10 and discussed subsequently. In further, non-illustrated embodiments, a leading inter-blade span that is closest to the leading longitudinal side 24 of the razor cartridge 20 is smaller than a trailing inter-blade span defined between the two cutting edges that are closest to the trailing longitudinal side 25 of the razor cartridge.

The each cutting member in the group of cutting members 29 comprises a longitudinal blade support 32. A longitudinal blade is mounted on the blade support 32. The cutting edge 30 of a cutting member 28*a-d* is oriented forward in the direction of shaving S. The blade support 32 of a cutting member 28*a-d* is an elongated, bent piece of rigid material. In an example, the blade support 32 is a metal such as austenitic stainless steel.

Each cutting member in the group of cutting members 29 is, in an example, resiliently mounted in a blade receiving section 31 of the razor cartridge 20. The blade receiving section 31 comprises a longitudinal space in the razor cartridge 20 that is sized to accommodate the group of cutting members 29. At least one cutting member of the group of cutting members 29, up to all cutting members in the group of cutting members 29 may be resiliently mounted in the blade receiving section 31. In the illustrated example of FIG. 4, the transverse inner sides of frame 21 comprise a plurality of holding slots 34. Each holding slot 34 on the transverse inner sides is configured to accept and retain one side of a blade support 32 of a cutting member of the group of cutting members 29 so that the cutting members of the group of cutting members 29 are held in the blade receiving section 31 with a substantially parallel inter-blade span. Therefore, as many holding slots 34 are provided in each transverse inner side of frame 21 as there are blade support members.

Between the blade receiving section 31 and the handle (in a part adjacent to a handle 2 connection, for example) there are, in examples, provided one or more cross members 35 that are integrally formed with the frame 21. The cross members 35 may comprise a plurality of blade support guides 36 provided as a plurality of protuberances aligned with the holding slot 34 on the transverse inner sides of the frame 21. The blade support guides 36 function to regulate the parallel inter-blade span in a longitudinal direction.

As explained above, a razor cartridge 20 according to the first aspect has a variable inter-blade span IBS. Therefore, in the illustrated variant of FIG. 4, the spacing of the blade supports 32 is progressively increased between the leading longitudinal side 24 and the trailing longitudinal side 25 of the razor cartridge 20 to generate the variable inter-blade span IBS. One alternative way to achieve this arrangement is to progressively increase the spacing between the holding slots 34 provided on the transverse inner sides in a transverse direction (y to −y) of the razor cartridge. The positioning and/or width of the blade support guides 36 is adjusted commensurately such that the group of inter blade spaces IBS between cutting edges 30 of the cutting members 28*a-d* is parallel. In another variant (not illustrated), the spacing of the blade supports 32 is progressively decreased between the leading longitudinal side 24 and the trailing longitudinal side 25 of the razor cartridge 20 to generate a variable inter-blade span IBS.

The razor cartridge 20 of FIG. 4 as comprises four resilient fingers 38*a*, 38*b*, 38*c*, 38*d* under the first retainer 26. The razor cartridge 20 comprises four resilient fingers under the second retainer 27 that are in transverse corresponding alignment with the four resilient fingers 38*a*, 38*b*, 38*c*, 38*d* under the first retainer 26.

In total, the eight resilient fingers each exert a bias force against respective cutting members of the group of cutting members 29 in the direction of the shaving plane SH such that the cutting members of the group of cutting members 29 are in a rest position, when assembled. In the rest position, the cutting edges 30 of the blades 33, at each lateral end of the blades 33 near the first 26 and second 27 retainers, bear against corresponding stop portions, for example. In an example, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the cross members 35. In a simplified razor cartridge design (such as for low cost, disposable razors), the resilient fingers may be omitted. A skilled person will appreciate that the number of resilient fingers 38 to be provided is related to the number of cutting members 28*a-d* in the group of cutting members 29, and that fewer or more than eight resilient fingers 38 can be provided.

Figure 5A:
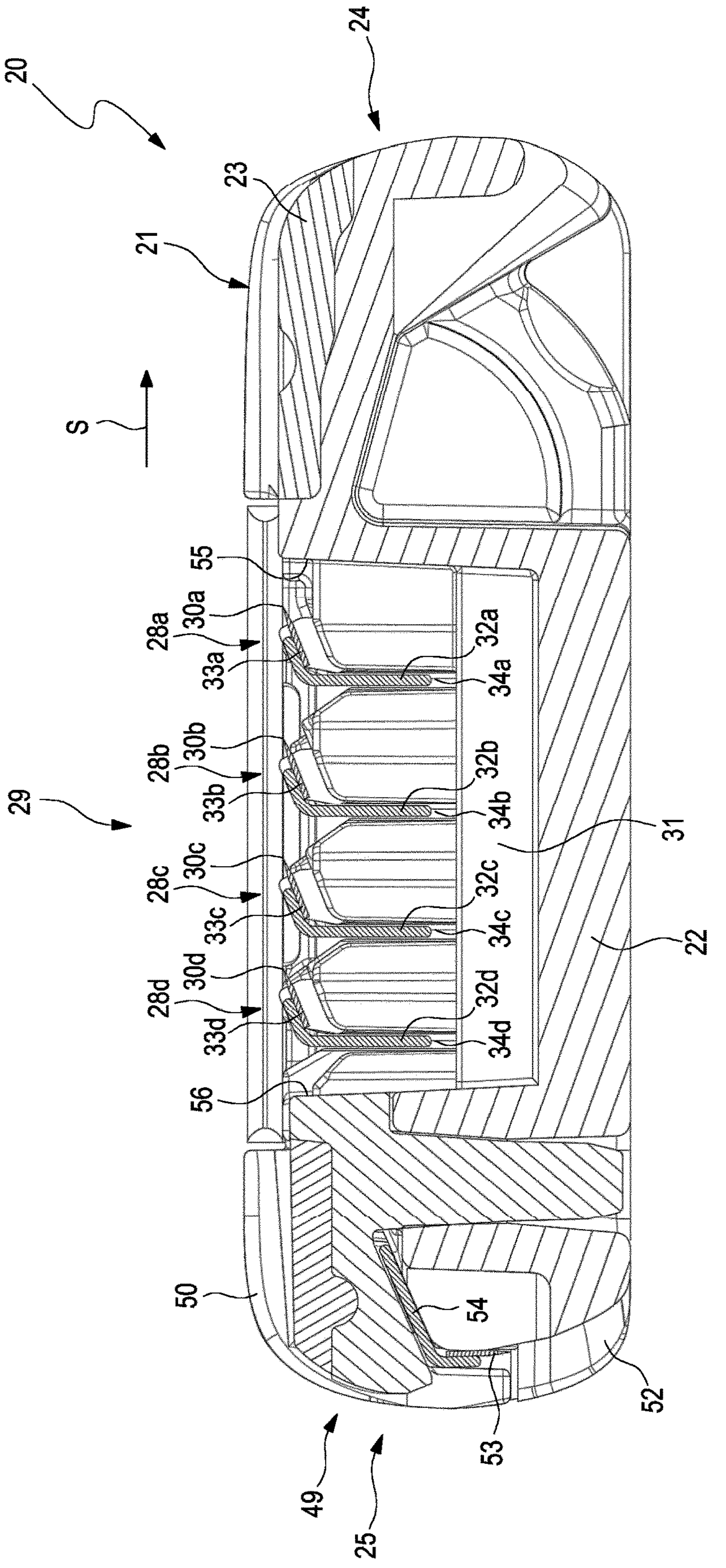
FIG. 5*a* is a schematic cutaway side view of a razor cartridge taken from the embodiment of FIG. 4 along axis P-Q.

FIG. 5*a* is a schematic cutaway side view of a razor cartridge taken from the embodiment of FIG. 4 along transverse axis P-Q illustrated by the dotted line in FIG. 4. Where possible, like elements are denoted with like reference numerals.

In addition to the features illustrated in partial exploded view FIG. 4, FIG. 5*a* further illustrates a longitudinal trailing assembly 49 that may, in some examples, be included as part of a razor cartridge 20 but is not essential.

In particular, the longitudinal trailing assembly 49, in examples, comprises a longitudinal skin care element 50 (e.g. a lubricating strip) for applying a compound, such as a lubricating compound, to the shaving plane after the cutting edges 30 of the blades have passed over the shaving plane.

The longitudinal trailing assembly 49, in examples, comprises a longitudinal trimming blade 53 disposed on the trailing longitudinal side 25 of the razor cartridge 20. The trimming blade 53 may, for example, be used for trimming hairs that are awkward to reach using the blades 33 of the group of cutting members 29, such as extraneous nasal hairs. In an example, the trimming blade 53 only extends across a proportion of the longitudinal direction of the longitudinal trailing assembly 49, such as up to three quarters, up to one half, or up to one quarter.

As illustrated, the trimming blade 53 is mounted on a trimming blade support 54. The assembly of the trimming blade 53 mounted on a trimming blade support 54 is, in an example, identical to the design of the blade receiving section 31, blade support 32, and blade 33 comprised in the group of cutting members 29 to reduce parts variation. Alternatively, the trimming blade 53 and trimming blade support 54 are produced to a different design to the design of the blade receiving section 31, blade support 32, and blade 33 comprised in the group of cutting members 29.

For the purposes of this specification, the trimming blade 53 is not comprised within the group of cutting members 29 intended to contact the shaving plane. For the purposes of this specification, an inter-blade span is defined between cutting edges 30*a-d* of the blades 33*a-d* of the group of cutting members 29, however a span between a cutting edge 30 of the trimming blade 53 and one of the cutting edges 30*a-d* of the blades 33*a-d* of the group of cutting members 29 is not considered to be an inter-blade span.

In an example, the longitudinal trailing assembly 49 comprises a retractable cover 52 as a safety feature, and to keep the trimming blade 53 sharp when not in use.

In common with the frame 21 of the razor, the longitudinal trailing assembly 49 and/or the retractable cover 52 may be provided as a plastic or resin material. In an example the longitudinal trailing assembly 49 is formed integrally with the frame 21. In an example, the longitudinal trailing assembly 49 is glued or ultrasonically welded to the frame 21, for example. In an example, a razor cartridge 20 is provided without a longitudinal trailing assembly 49 such that the trailing edge of the frame 21 in the shaving direction is the trailing longitudinal side 25 of the razor cartridge 20. In an embodiment where the razor cartridge 20 comprises the longitudinal trailing assembly 49, the trailing longitudinal side 25 of the longitudinal trailing assembly 49 in the shaving direction is considered to be the trailing edge of the frame 21 in the shaving direction.

FIG. 5*a* illustrates a side view of the holding slots 34 provided in the first 26 and second 27 retainer for holding the group of cutting members 29. The plurality of blade support guides 36 and the plurality of resilient fingers 38 shown in FIG. 4 is not shown in the projection of FIG. 5*a* to aid clarity.

FIG. 5*a* illustrates a progressively increasing span in the longitudinal direction between the succession of holding slots 34 for holding the group of cutting members 29 provided in the first 16 and second 18 side portions, in the direction from the leading longitudinal side 24 to the trailing longitudinal side 25.

Of course, the provision of a succession of holding slots 34 in the first 26 and second 27 retainers to support the cutting members of the group of cutting members 29 is not essential. The group of cutting members 29 could also be supported using a plurality of blade support guides 36 (protuberances) positioned on one or more cross members 35, for example, where the plurality of blade support guides 36 provide a progressively increasing inter-blade span in the longitudinal direction from the leading longitudinal side 24 to the trailing longitudinal side 25 of the razor cartridge 20. In an example, a plurality of blade support guides 36 and a succession of holding slots 34 may be used in combination to provide progressively increasing span in the longitudinal direction between the leading and the trailing side of the razor cartridge.

Figure 5B:
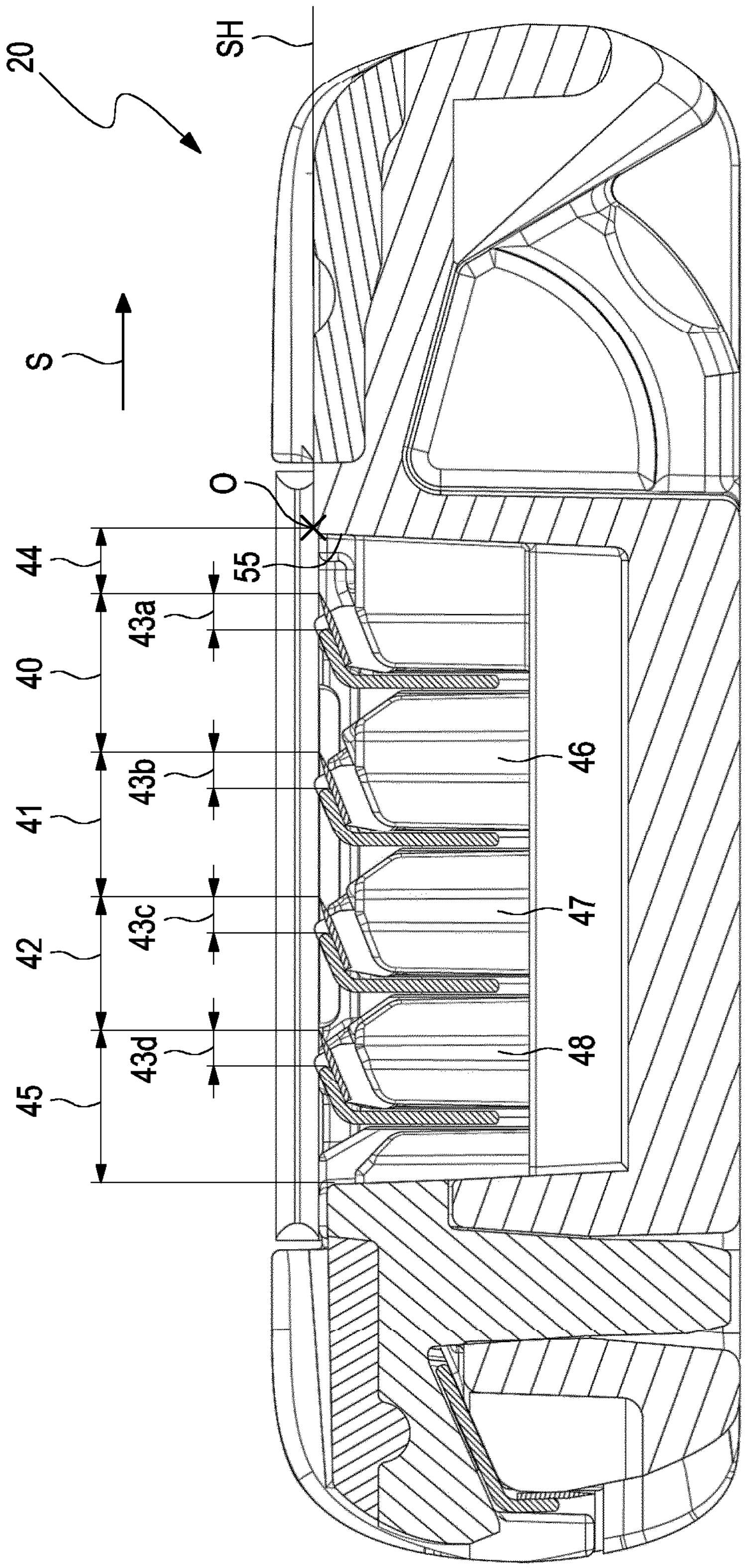
FIG. 5*b* is a duplicate of the schematic cutaway side view of the razor cartridge shown in FIG. 5*a* that has been differently annotated to illustrate the inter-blade spacing.
Figure 6:
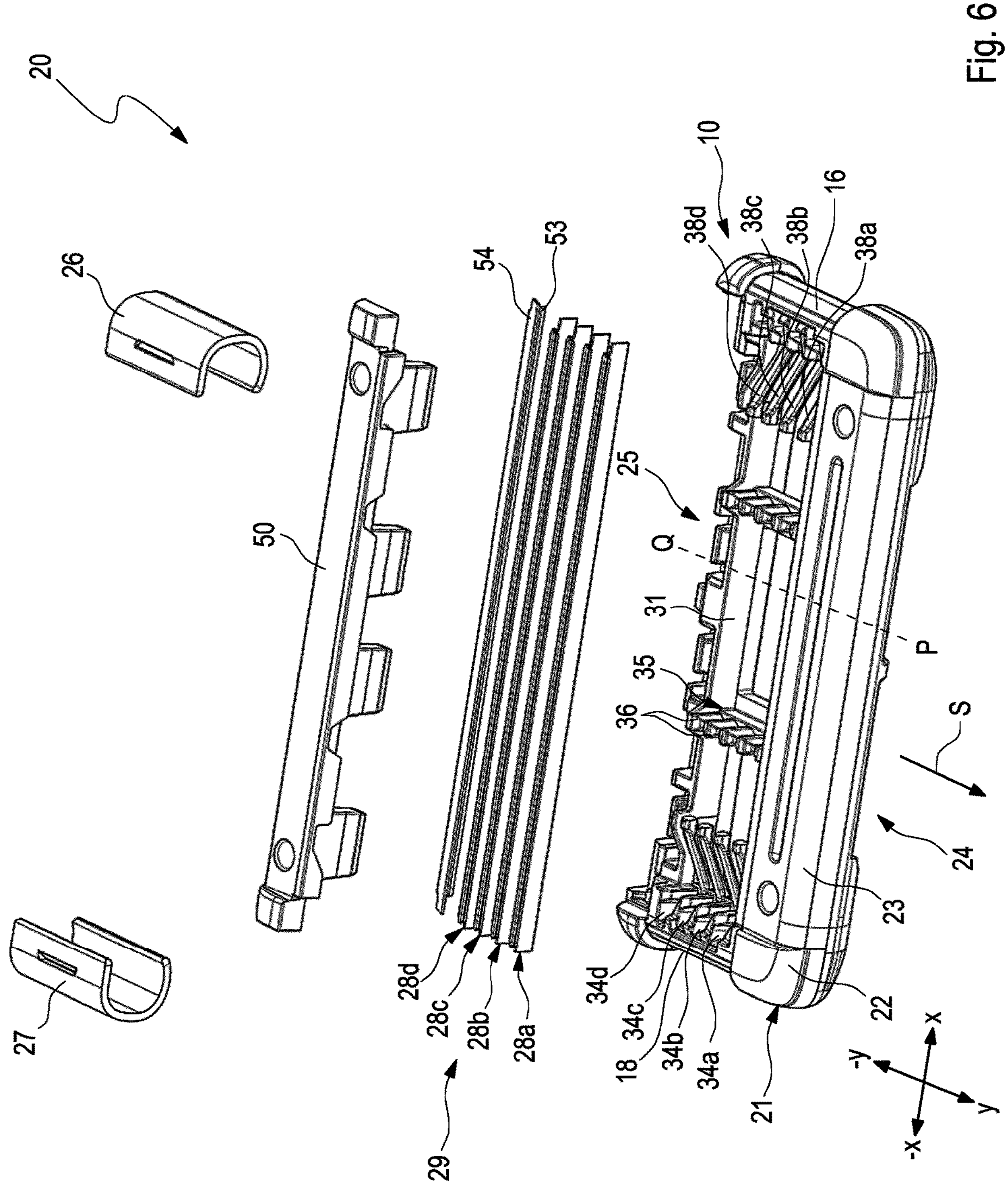
FIG. 6 is an alternative exploded view of an alternative embodiment of a razor cartridge showing the relative position of a trimming blade and/or skin care element (lubricating strip) sub assembly.

FIG. 5*b* is a duplicate of the schematic cutaway side view of the razor cartridge 20 shown in FIG. 5*a* that has been annotated to denote inter-blade spacing. The longitudinal line on the internal leading longitudinal wall of the blade receiving section 55 that is closest to a shaving plane SH in use serves as an origin O for the purposes of the present definition.

A leading blade 33*a* to frame 21, span 44 is the transverse span (substantially aligned with the shaving direction S) that is perpendicular to the longitudinal orientation of the blades of the group of cutting members 29 that spans the space between the internal leading longitudinal wall of the blade receiving section 55 that is closest to a shaving plane SH in use (the origin) and the cutting edge 30*a* of the leading blade of the group of cutting members 29.

A leading inter-blade span 40 that is the closest inter-blade span to the leading longitudinal side 24 of the razor cartridge is a transverse span (substantially aligned with the shaving direction S in use) that is substantially perpendicular to the longitudinal orientation of the blades of the group of cutting members 29. The leading inter-blade span 40 begins at a point on cutting edge 30*a* and ends on to a corresponding point on the cutting edge 30*b* of the first intermediate blade 33*b*.

A first intermediate inter-blade span 41 is a transverse span (substantially aligned with the shaving direction S in use) that is substantially perpendicular to the longitudinal orientation of the blades of the group of cutting members 29. The first intermediate inter-blade span 41 begins at a point on cutting edge 30*b* and ends on a corresponding point on the cutting edge 30*c* of the second intermediate blade 33*c*.

A trailing inter-blade span 42 is a transverse span (substantially aligned with the shaving direction S in use) that is perpendicular to the longitudinal orientation of the blades of the group of cutting members 29. The trailing inter-blade span 42 begins a point on cutting edge 30*c* and ends on a corresponding point on the cutting edge 30*d* of the blade 33*d* that is closest to the trailing longitudinal side 25 of the razor cartridge 20.

A trailing blade to frame span 45 that is a transverse span (substantially aligned with the shaving direction S in use) that is perpendicular to the longitudinal orientation of the blades of the group of cutting members 29 the cutting edge 30*a* and a corresponding point on the internal trailing longitudinal wall of blade receiving section 56.

Thus, the total span of the blade receiving section 31 corresponds to the sum of spans 44, 40, 41, 42, and 45. In practice, the total span of the blade receiving section may be in the range of 7 to 15 mm.

As will subsequently be discussed, each blade mounting portion 71 is disposed on an inner surface 66 of a respective blade support 32 that, in use, faces away from a shaving plane SH. The cutting edge 30 extends forward from the front of the blade support 32. However, the blade support 32 has a non-negligible thickness. For example, the blade support 32 has a thickness in the range 0.12 mm-0.21 mm, and more specifically in the range 0.155 mm-0.185, and most specifically 0.17 mm.

Consequently, a non-negligible span defined as the transverse span (substantially aligned with the shaving direction S in use) that is perpendicular to the longitudinal orientation exists between each cutting edge 30 and the blade-mounting end of each blade support 32 of each cutting member of the group of cutting members 29. This may be referred to as a cutting edge to blade span 43 of a respective cutting member. The edge support span may be derived using trigonometry based on the thickness of the blade support 32 and the tilt angle relative to the shaving plane of the blade receiving section 31 of the blade support 32.

In an example, each blade support 32 of the group of cutting members 29 is identical and has the same thickness T2 and the same tilt angle A. In this case, the cutting edge to blade span 43*a*, 43*b*, 43*c*, and 43*d* are identical.

In an example, one or more of the cutting edge to blade spans 43*a*, 43*b*, 43*c*, and 43*d* are in the range 0.3 mm to 0.6 mm, and specifically 0.5 mm.

In an example, at least one blade support 32 of the group of cutting members 29 has a different thickness and/or tilt angle to the remainder of the blade supports 32. In this case, at least one a cutting edge to blade span 43*a* will differ from the remainder. An effect is that individual cutting edge to blade spans 43*a*-43*d* may be tuned to provide further fine control over skin bulge effects. For example, the cutting edge to blade span 43*a*-43*d* may be designed to progressively increase or decrease. A leading blade to frame span 44 is a transverse span (substantially aligned with the shaving direction S in use) that is perpendicular to the longitudinal orientation of the blades of the group of cutting members 29. The leading blade to frame span begins at a point on the internal leading longitudinal wall 55 that is, in an example, closest to the shaving plane SH. The leading blade to frame span ends at a corresponding point on the cutting edge 30*d* of the blade 33 of the leading cutting member 28*d* that is in an example, closest to the shaving plane SH.

In an example the leading frame to blade span 44 is 0.5 mm to 0.9 mm, and specifically 0.7 mm.

A trailing blade to frame span 45 is a transverse span (substantially aligned with the shaving direction S in use) that is perpendicular to the longitudinal orientation of the blades of the group of cutting members 29. The trailing blade to frame span begins at a point on the cutting edge 30*a* of the blade 33*a* of the trailing cutting member 28*a-d*. The trailing blade to frame span 45 ends at a corresponding point on the internal trailing longitudinal wall 56 that is, in an example, closest to the shaving plane SH.

In an example, the trailing frame to blade span 45 is 1.6 mm to 2.0 mm, and specifically 1.8 mm. In an example, the leading blade to frame span 44 is greater than the trailing blade to frame span 45. In an example, the leading blade to frame span 44 is smaller than the trailing blade to frame span 45.

In an example, the leading blade to frame span 44 is substantially equal to the trailing blade to frame span 45. In an example, the leading blade to frame span 44 is greater than the leading inter-blade span 40. In an example, the leading blade to frame span 44 is substantially equal to the leading inter-blade span 40. In an example, the leading blade to frame span 44 is smaller than the leading inter-blade span 40. In an example, the trailing blade to frame span 45 is greater than the trailing inter-blade span 42. In an example, the trailing blade to frame span 45 is substantially equal to the trailing inter-blade span 42. In an example, the trailing blade to frame span 45 is smaller than the trailing inter-blade span 42. In an example, the first intermediate inter-blade span 41 and the second intermediate inter-blade span are each substantially equal to the leading inter-blade span 40. In an example, the first intermediate inter-blade span 41 and the second intermediate inter-blade span are each substantially equal to the trailing inter-blade span 42. In an example, the first intermediate inter-blade span 41 is greater than the leading inter-blade span 40 and smaller than the second intermediate inter-blade span.

In an example, the second intermediate inter-blade span is equal to the trailing inter-blade span 42. In an example, a leading inter-blade span that is closest to the leading longitudinal side of the razor cartridge is smaller than a trailing inter-blade span that is closest to the trailing longitudinal side of the razor cartridge.

FIG. 5*b* also illustrates a first debris run-off portion 46, a second debris run-off portion 47, and a third debris run-off portion 48. The width of the debris run-off portions is defined by the relative spacing of the cutting members of the group of cutting members 29. As illustrated, the first debris run-off portion 46 is wider than the second debris run-off portion 47, which in turn is wider than the third debris run-off portion 48. An effect of this is that, in use, a greater amount of hair clippings and foam can be removed via the debris run-off portions (such as first debris run-off portion 46) that are progressively closer to the leading edge of the razor cartridge 20.

Design of the size of the leading blade to frame span 44 and/or the trailing blade to frame span 45 is optional. The leading blade to frame span 44 may be larger than, equal to, or smaller than the leading inter-blade span 40. The trailing blade to frame span 45 may be larger than, equal to, or smaller than the trailing inter-blade span 42.

In an example, the leading inter-blade span 40 is smaller than the trailing inter-blade span 42.

In an example, the first intermediate inter-blade span is equal to, or greater than, the leading inter-blade span. In an example, the first intermediate inter-blade span is equal to, or smaller than, the trailing inter-blade span. Although a razor cartridge with four blades 33*a-d* has been illustrated, the present specification also includes a razor cartridge comprising three blades, or greater than four blades.

For example, five substantially parallel cutting members 28*a-d* may be disposed in a shaving direction of the razor cartridge 20, wherein a second intermediate inter-blade span is defined adjacent to the trailing inter-blade span 42. In an example, the first intermediate inter-blade span 41 and the second intermediate inter-blade span are each substantially equal to the leading inter-blade span.

In an example, the first intermediate inter-blade span 41 and the second intermediate inter-blade span are each substantially equal to the trailing inter-blade span 42. In an example, the first intermediate inter-blade span is greater than the leading inter-blade span 40 and smaller than the second intermediate inter-blade span. In an example, the second intermediate inter-blade span is equal to the trailing inter-blade span 42. In an example, consecutive inter-blade spans of the razor cartridge successively increase between the leading longitudinal side 24 and the trailing longitudinal side 25 of the razor cartridge in the shaving direction.

In an example, each of the blade supports 32*a-d* comprises a shaving plane contact portion 58 that is configured, in use, to contact the shaving plane SH in addition to the cutting edges 30 of the blades, thereby reducing the pressure at each cutting edge contact point with the shaving plane. The pressure at the cutting edge contact points may therefore be reduced, compared to a conventional razor head, but glideness performance remains improved.

Figure 7:
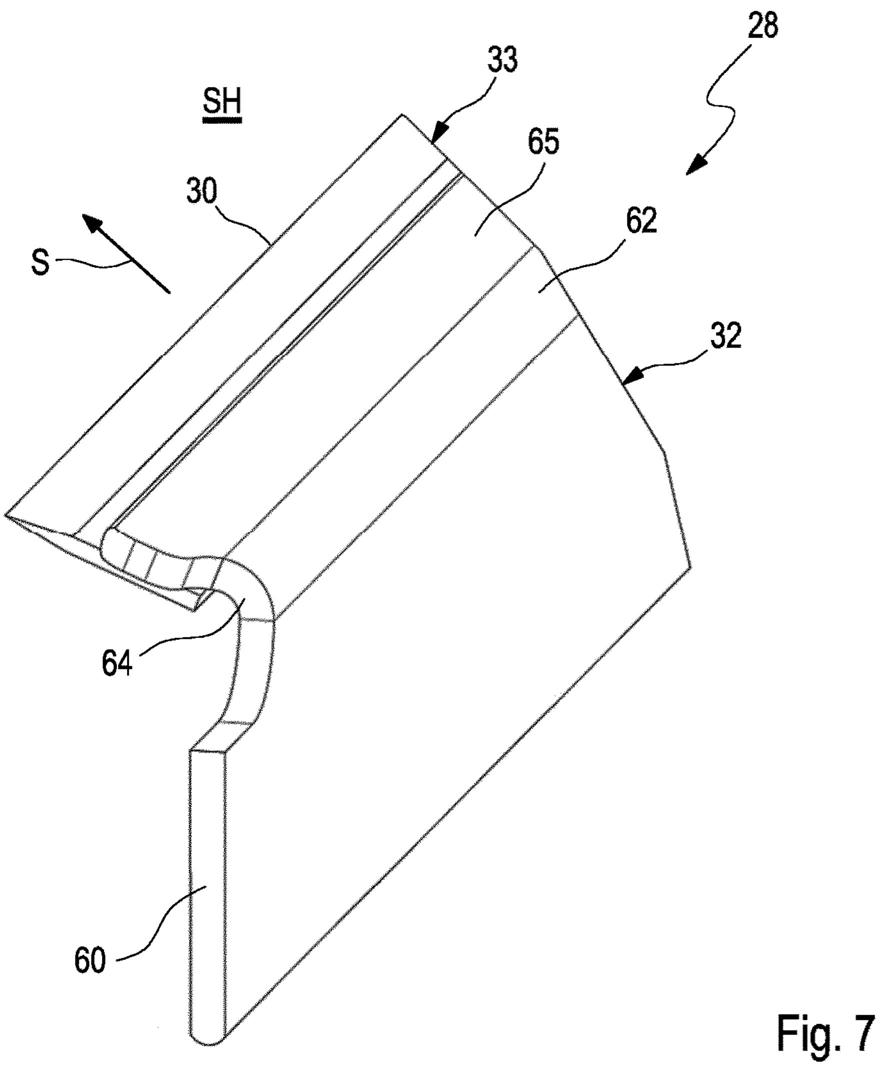
FIG. 7 is a perspective detail view of an end of a cutting member.

FIG. 7 is a perspective cutaway view of an end of a cutting member 28. The cutting member 28 is a sub-assembly comprising a longitudinal blade 33 mounted on a longitudinal blade support 32. The lower portion 60 of the blade support 32 is suitable for being held in the holding slots 34 of the frame 21 of the razor cartridge. A bend 62 of the longitudinal blade support 32 defines an angle of approach of the longitudinal blade 33 to the shaving plane SH.

Figure 9:
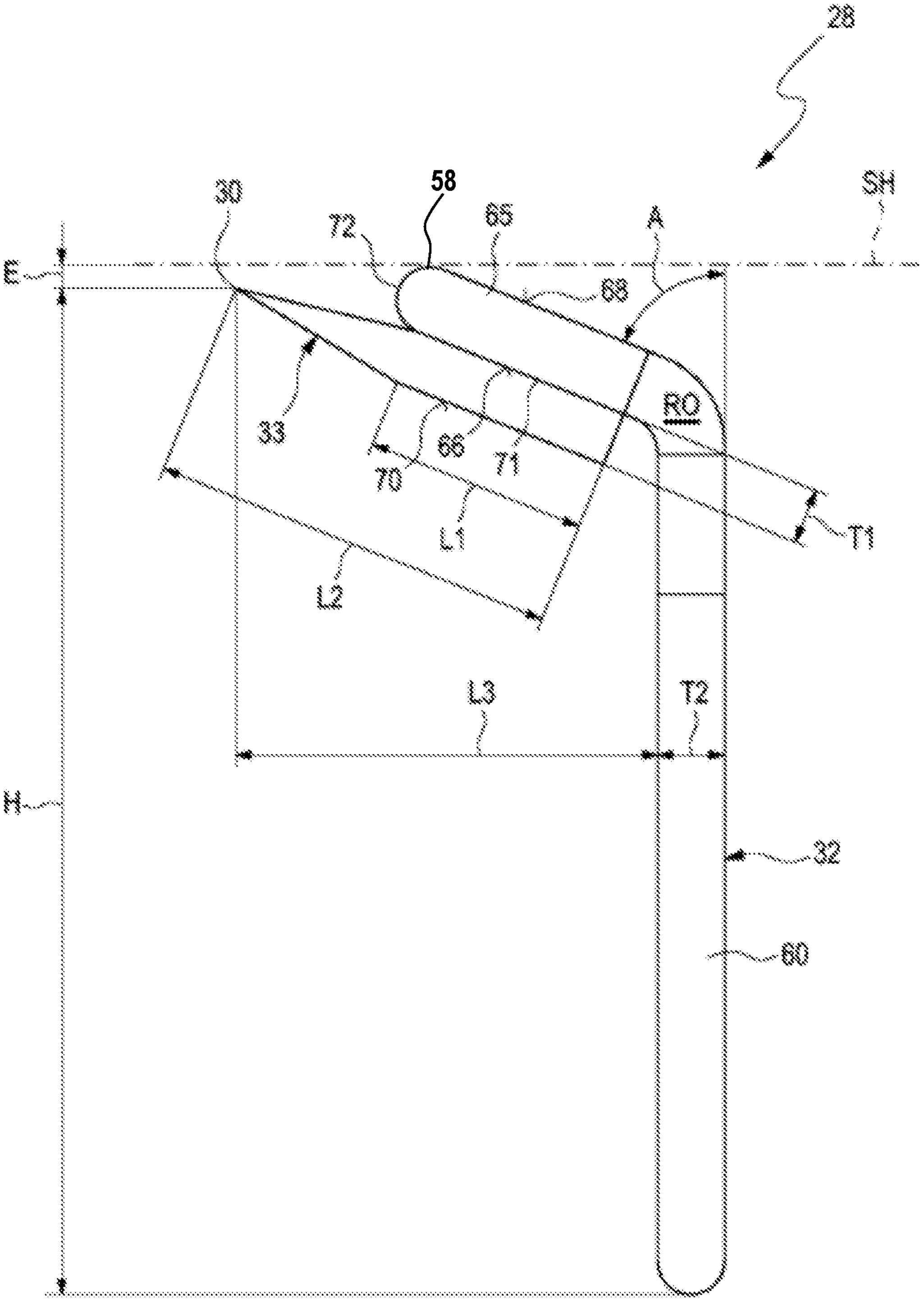
FIG. 9 is a schematic side view of a cutting member comprising a blade mounting portion disposed on an inner surface of the respective blade support that, in use, faces away from a shaving plane.

Turning briefly to FIG. 9, the approach angle A defines the angle of declination of the inner surface 66 of the blade support 32 from the reference of the blade support 32. In an example, A is an acute angle, specifically between 60 and 75 degrees, more specifically 68 degrees.

Returning to FIG. 7, the longitudinal blade 33 comprises a cutting edge 30 capable of cutting hairs. In an example, a rounded indent 64 is cut from the sheet metal forming the blade support 32.

Conventionally, a blade is mounted on the outer surface of a blade support, such that in use, no part of the blade support comes into contact with shaving plane SH.

Notably, in the present aspects and embodiments, a blade mounting portion 71 of the blade support 32 is disposed on an inner surface of the respective blade support that, in use, faces away from a shaving plane SH, and a blade attached to the blade mounting portion 71 as shown in FIG. 7.

According to the present approach, the blade 33 is mounted on an inner surface of the respective blade support and projects from underneath the inner surface defining a cutting edge to blade span 43 between a cutting edge 30 of the blade 33 and the end of the blade support 32 towards the shaving plane SH. In use, as the cutting member 28 contacts the shaving plane SH, both the cutting edge 30 of the blade 33 and the end of the blade support 32 contact the shaving simultaneously, leading to a reduction in the force exerted on the shaving plane SH exerted by a single cutting edge, for example.

In other words, the position of a blade 33 on a blade support 32 when a cutting member 28*a-d* is mounted in the razor cartridge is defined by the fact that an imaginary tangent provided from the surface of the blade 33 that is directed away from the shaving plane SH does not pass through any point of the blade support 32 that the blade 33 is mounted on.

A further definition of the position of a blade 33 on the blade support is that when a cutting member 28*a-d* is mounted in the razor cartridge, an imaginary tangent provided from the portion of the blade 33 in contact with the blade mounting portion 71 that is directed towards the shaving plane SH in use passes through the blade support 32 that the blade 33 is mounted on.

Figure 8:
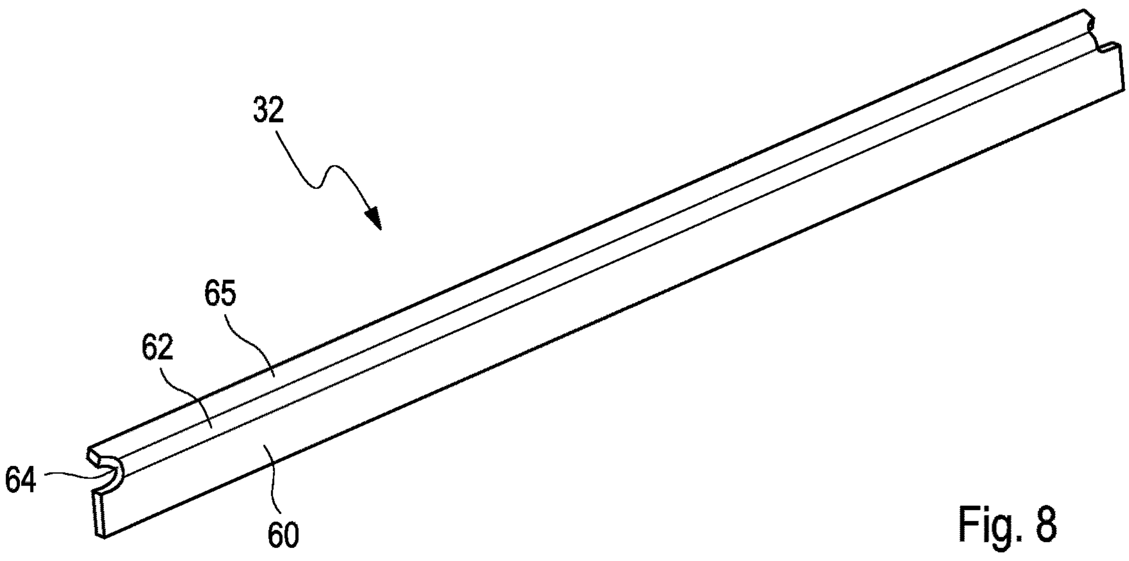
FIG. 8 is a perspective view of a blade support member.

FIG. 8 is a perspective view of a longitudinal blade support member 32 without a blade. It comprises substantially elongated flat lower portion 60, a substantially elongated flat top side 65, and a radius bend portion 62. The radius bend portion 62 may have an inner radius of curvature RO that is more than 0.1 mm. The radius bend portion 62 may have an inner radius of curvature RO that is less than 0.9 mm. A minimum recommended inner radius of curvature RO of sheet metal should be at least the same as its thickness T. A safety factor of the thickness of the blade support 32 may be applied. By multiplying the safety factor with the preferable thickness of T (around 0.17 mm), the radius of curvature RO may be approximately 0.25 mm, specifically between 0.16 mm and 0.40 mm, and most specifically between 0.25 mm or 0.28 mm.

FIG. 9 is a schematic side view of a cutting member 28 comprising a blade mounting portion 71 disposed on an inner surface of a blade support that, in use, faces away from a shaving plane SH.

As discussed, the blade support 32 may be made from a flat sheet metal part which is bent before welding of the blade 33 on the inner surface 66 of the blade support 32. The cutting member 28 thus comprises a blade 33 (razor blade).

The blade 33 has, in its flat portion, a thickness T1 about 0.1 mm (for example, between 0.04 and 0.11 mm). The total length L2 of the blade 33 between the cutting edge 30 of the blade 33 and the opposite back edge of the blade 33 is about 1 mm (for example, between 0.8 mm and 1.3 mm). The portion of the blade 33 that is in contact with the inner surface 66 of a blade support that, in use, faces away from a shaving plane SH has a length L1 that is about 0.49 mm+/−0.1 mm long. In this way, a good retention of the blade on the underside of the blade support 32 (the inner surface of the blade support 32) is ensured.

In an example, the height H of the cutting member 28 is between 2.53 mm and 2.63 mm, particularly 2.58 mm.

In an example, the front end 72 of the blade support is rounded or chamfered to improve glideness properties of the cutting member.

In an example, the blade 33 may be positioned on the inner surface 66 of the blade support 32 to adjust the exposure E of the cutting edge 30 positively or negatively compared to the shaving plane SH. The exposure is a measure of how prominently the cutting edge 30 of a blade protrudes above or sinks below the end 72 of its blade support.

In an example, the blade 33 may be positioned to have an exposure relative to the shaving plane SH in the range −80 um to +80 um, specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The length L3 of the cutting member 28, between the cutting edge 30 and the outer face of the lower portion of the blade support 32 is about 1.0 mm (for example, between 0.9 mm and 1.6 mm).

The blade 33 is fixed on the inner surface 66 of the blade support by any known means, such as by laser spot welding. In examples, the blade 33 is fixed on the inner surface 66 of the blade support by a plurality of spot welds (for example, between ten and sixteen spot welds) distributed along the longitudinal dimension of the blade support 32. Each of the spot welds may be performed on the inner face 70 of blade 33. Alternatively, each of the spot welds may be carried out on the outer surface 68 of the blade support 32, or a mixture of the two.

Figure 10:
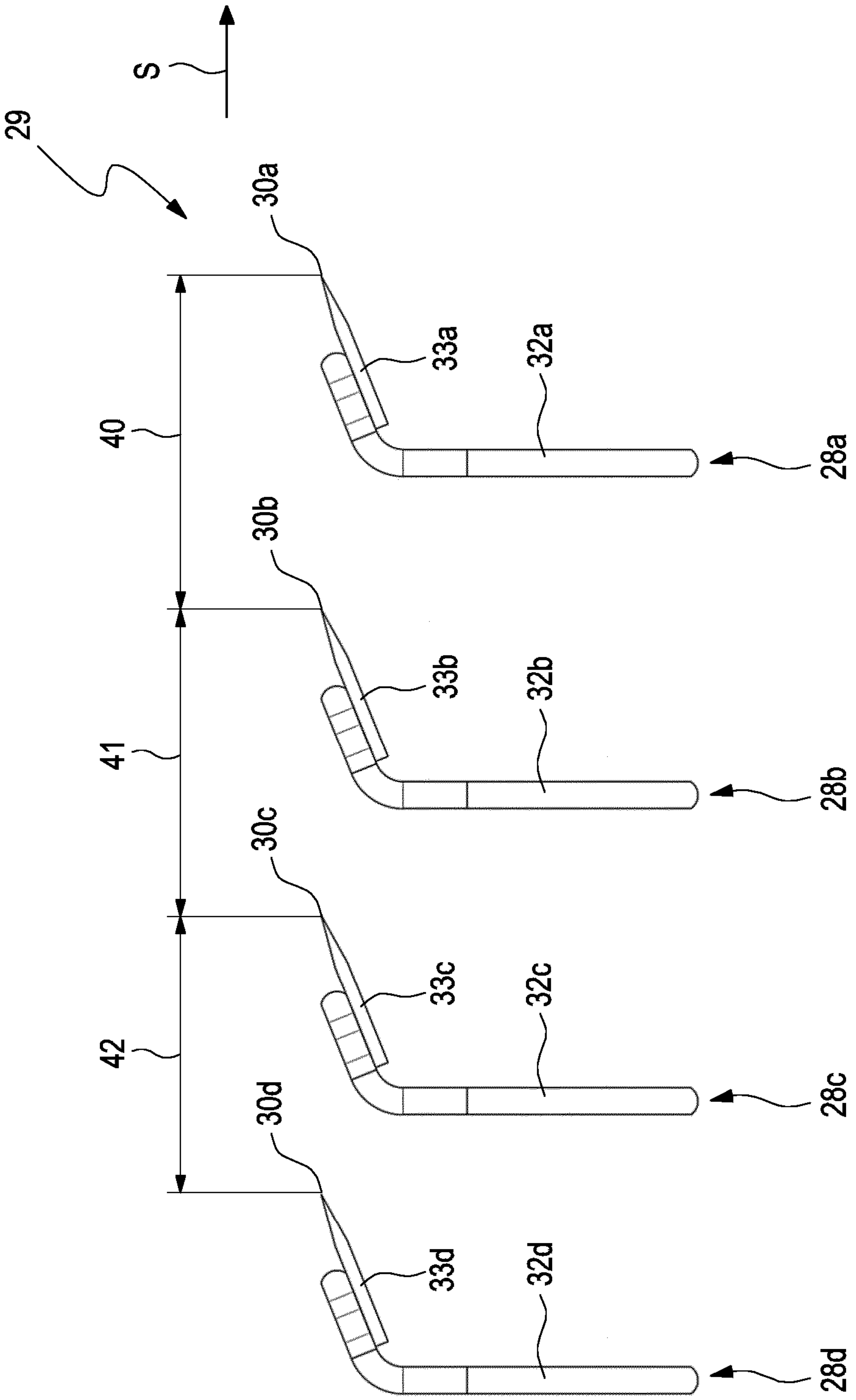
FIG. 10 illustrates a schematic side view of four razor blades of the razor cartridge according to an embodiment.

FIG. 10 illustrates an example schematic side view of a group of cutting members 29 with inter blade spans in accordance with one exemplary implementation. Four razor blades of the razor cartridge according to an embodiment. FIG. 10 illustrates that the leading inter blade span 40 is larger than trailing inter-blade span 42.

In FIG. 10, the first intermediate inter-blade span 41 is smaller than the leading inter blade span 40 but greater than trailing inter-blade span 42, however this is not an essential feature. For example, the first intermediate inter-blade span 41 may be equal to either of the trailing inter-blade span 42 or the leading inter blade span 40.

Specific measurements of the separation distance ranges inter-blade spans will now be discussed. A skilled person will appreciate that many choices and combinations of inter-blade spans may be made that satisfy the above-discussed features of the razor cartridge 20, and that the following discussion is not limited to the disclosed values.

In an example, the trailing inter blade span 42 is within a range of 1.6 mm to 2.2 mm, 1.70 mm to 2 mm, or 1.75 mm to 1.95 mm.

When three cutting members 28*a-c* are present, the trailing inter blade spans defined above may still apply, in combination with a leading inter-blade span 40 in a range of 1.6 mm to 2.2 mm, 1.70 mm to 2.00 mm, or within 1.75 mm to 1.95 mm.

When four cutting members 28*a-d* are present, the leading inter-blade span 40 is in a range of 1.6 mm to 2.2 mm, 1.70 mm to 2.00 mm, or within 1.75 mm to 1.95 mm.

In an example, the trailing inter blade span 42 is within a range of 1.7 mm to 2.2 mm, 1.8 mm to 2.0 mm, or is 1.85 mm.

In an example, the first intermediate inter blade span 41 is within a range of 1.55 mm to 1.95 mm, 1.60 mm to 1.80 mm, or is 1.70 mm.

In an example, the leading inter-blade span 40 is within a range of 1.4 mm to 1.8 mm, specifically 1.50 mm to 1.65 mm, or is 1.55 mm.

In an example, the leading blade to frame span 44 is within a range of 0.4-1.0 mm, 0.5 mm to 0.8 mm, or is 0.7 mm.

In an example, the trailing blade to frame span 45 is within a range of 1.7 mm to 2.2 mm, 1.8 mm to 2.0 mm, or is 1.85 mm.

The ranges discussed above are generally increased as compared to conventional razor cartridges. The rinsability of a cartridge as discussed herein is generally improved, because more space is available between the trailing cutting members 28*a-d* for debris to flow off closer to the trailing edge of the razor cartridge 20. The size of skin bulges is also reduced, resulting in an improved shaving performance.

According to the embodiment in which the leading inter blade span 40 is larger compared to the first intermediate inter blade span 41 or the trailing inter-blade span 42, the first two blades that cut the highest amount of hair are far enough apart to ensure that the debris can be removed easily. Therefore, a safer shaving experience is provided. Providing the blade support "on top" of the blade provides an additional skin-contacting element (as well as the cutting edges 30 of the blades) which supports the skin during shaving.

In an embodiment where the trailing inter blade span 42 is greater than the leading inter blade span 40, consecutive inter-blade spans of the razor cartridge successively decrease between the leading longitudinal side 24 and the trailing longitudinal side 25 of the razor cartridge in the shaving direction.

In an example, any possibly combination of inter-blade spans is possible, provided a leading inter-blade span that is closest (or closer) to the leading longitudinal side 24 of the razor cartridge is smaller than a trailing inter-blade span that is closest (or closer) to the trailing longitudinal side 25 of the razor cartridge.

In another example, the leading inter blade span 40 is within a range of 1.6 mm to 2.2 mm, 1.70 mm to 2 mm, or 1.75 mm to 1.95 mm.

When three cutting members 28*a-c* are present, the leading inter blade spans defined above may still apply, in combination with a trailing inter-blade span 42 in a range of 1.6 mm to 2.2 mm, 1.70 mm to 2.00 mm, or within 1.75 mm to 1.95 mm.

When four cutting members 28*a-d* are present, the trailing inter-blade span 42 is in a range of 1.6 mm to 2.2 mm, 1.70 mm to 2.00 mm, or within 1.75 mm to 1.95 mm.

In an example, the leading inter blade span 40 is within a range of 1.7 mm to 2.2 mm, 1.8 mm to 2.0 mm, or is 1.85 mm. In an example, the first intermediate inter blade span 41 is within a range of 1.55 mm to 1.95 mm, 1.60 mm to 1.80 mm, or is 1.70 mm. In an example, the trailing inter-blade span 42 is within a range of 1.4 mm to 1.8 mm, specifically 1.50 mm to 1.65 mm, or is 1.55 mm. In an example, the leading blade to frame span 44 is within a range of 0.4-1.0 mm, 0.5 mm to 0.8 mm, or is 0.7 mm. In an example, the trailing blade to frame span 45 is within a range of 1.7 mm to 2.2 mm, 1.8 mm to 2.0 mm, or is 1.85 mm.

However, in this example, any possibly combination of inter-blade spans is possible, provided a leading inter-blade span that is closest (or closer) to the leading longitudinal side 24 of the razor cartridge is smaller than a trailing inter-blade span that is closest (or closer) to the trailing longitudinal side 25 of the razor cartridge.

According to the embodiment in which the leading inter blade span 40 is smaller compared to the first intermediate inter blade span 41 or the trailing inter-blade span 42, the blades towards the front of the razor cartridge 20 accordingly have a narrower IBS, that further reduces the risk of nicks and cuts. Therefore, a safer shaving experience is provided. Providing the blade support "on top" of the blade provides an additional skin-contacting element (as well as the cutting edges 30 of the blades) which supports the skin during shaving. Because frequent shavers do not generate as much debris when shaving, it is not as critical that a large amount of debris needs to be conducted away from the inter-blade gap that is closer to the leading edge of the razor cartridge.

Figure 11:
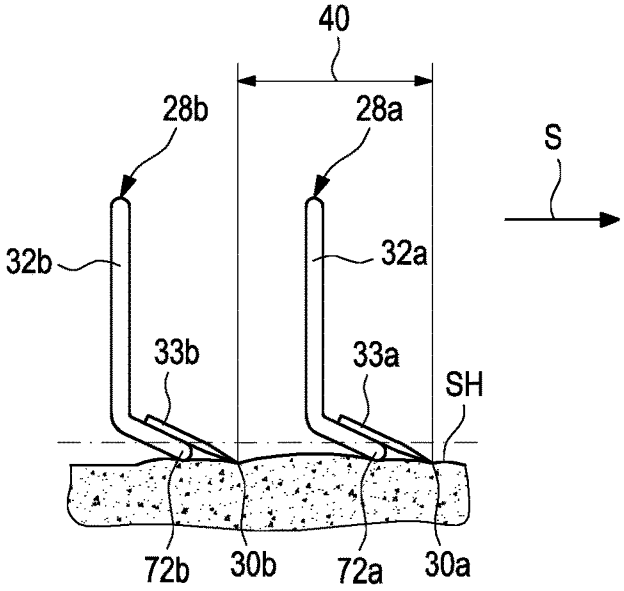
FIG. 11 illustrates a side view of a blade arrangement illustrating the reduction in skin bulging when enabling the blade support member to contact the skin during shaving.

FIG. 11 illustrates a side view of a blade arrangement illustrating the reduction in skin bulging when enabling the blade support member to contact the skin during shaving when the inter-blade span is greater at the leading longitudinal side compared to the trailing longitudinal side.

Figure 12:
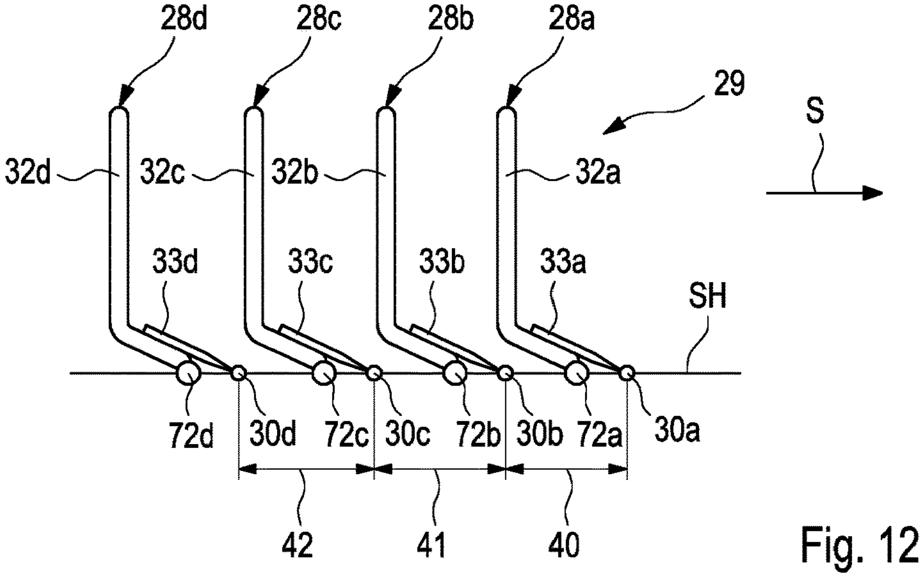
FIG. 12 illustrates a further side view of a blade arrangement illustrating the benefit of enabling the blade support member to contact the skin.

FIG. 12 illustrates a further side view of a blade arrangement illustrating the benefit of enabling the blade support member to contact the skin when the inter-blade span is greater at the leading longitudinal side compared to the trailing longitudinal side.

Figure 13:
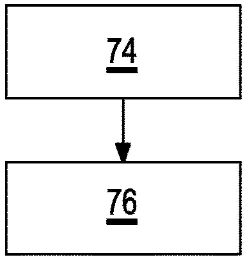
FIG. 13 illustrates a method of manufacturing a razor cartridge according to an aspect.

FIG. 13 illustrates a method of manufacturing a razor cartridge according to a further aspect.

The method comprises:

obtaining 74 a razor cartridge housing and three or more cutting members 28*a-c*, wherein each of the cutting members 28*a-c* comprises a blade support comprising a blade mounting portion 71 disposed on an inner surface 66 of the respective blade support that in use faces away from a shaving plane (SH) and a blade attached to the blade mounting portion 71; and disposing the three or more cutting members 28*a-d* between a leading longitudinal side 24 and a trailing longitudinal side 25 of the razor cartridge housing in a shaving direction of the razor cartridge, wherein in use, the inner surface of the respective blade support faces away from a shaving plane (SH);

wherein the cutting members 28*a-d* define a plurality of inter-blade spans between cutting edges 30 of the blades; and wherein a leading inter-blade span that is closest to the leading longitudinal side 24 of the razor cartridge is different to a trailing inter-blade span that is closest to the trailing longitudinal side 25 of the razor cartridge.

FIG. 1 illustrates a shaving razor assembly 1 according to a further aspect. The shaving razor assembly 1 comprises a razor handle 2 and a razor cartridge 20 according to the first aspect or one of its embodiments, wherein the razor cartridge is either releasably attached to the razor handle via a pivotable 8 or non-pivotable connection, integrally formed with the razor handle via a non-pivotable connection, or integrally formed with the razor handle via a pivotable connection.

According to a further aspect, there is provided a kit of parts comprising a razor handle 2 and a razor cartridge holder comprising a plurality of razor cartridges razor cartridge 20 according to the first aspect or its embodiments.

In the preceding specification, a razor blade comprising at least three cutting members 28*a-c* according to the aspect may have fourth and fifth blades, according to specific embodiments. The leading inter-blade span, the trailing inter-blade blade span, the first intermediate blade span, and where relevant the second inter-blade span are defined between the cutting edges 30 of the respective three, four, or five blades. For example, in the case of three cutting members 28*a-c*, a first intermediate blade span, and second inter-blade span and not present. In an embodiment with four cutting members 28*a-d*, a second intermediate inter-blade span it not present. In an embodiment with five blades, the leading inter-blade span, first and second intermediate inter-blade spans, and a trailing inter-blade span are present.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

The present disclosure extends to the following statements, which define embodiments of the techniques disclosed:

A1. A razor cartridge (20) comprising:

three or more substantially parallel cutting members (28*a-d*) disposed between a leading longitudinal side (24) and a trailing longitudinal side (25) of the razor cartridge in a shaving direction (S) of the razor cartridge;

wherein each of the cutting members (28*a-d*) comprises a blade support (32) comprising a blade mounting portion (71) disposed on an inner surface (66) of the respective blade support that, in use, faces away from a shaving plane (SH), and a blade (33) attached to the blade mounting portion (71);

wherein the cutting members (28*a-d*) are disposed to define a plurality of inter-blade spans (40, 41, 42) between cutting edges (30) of the blades; and wherein a leading inter-blade span (40) that is closer to the leading longitudinal side (24) of the razor cartridge than a trailing inter-blade span (42) is greater than the trailing inter-blade span (42) that is closer to the trailing longitudinal side (25) of the razor cartridge than the leading inter-blade span.

A2. A razor cartridge (20) according to statement A1, further comprising:

first and second debris run-off portions (46, 47) arranged at least in correspondence with the leading inter-blade span (40) and the trailing inter-blade span (42), respectively, wherein the first debris run-off portion (46) is dimensioned to conduct relatively more debris than the second debris run-off portion (47) out of the respective leading or trailing longitudinal inter-blade spans (40, 42) during shaving and/or rinsing.

A3. The razor cartridge (20) according to any one of statements A1 or A2, comprising:

a fourth substantially parallel cutting member disposed between the leading (24) and trailing (25) longitudinal sides of the razor cartridge in the shaving direction (S) of the razor cartridge, wherein a first intermediate inter-blade span (41) is further defined between the leading inter-blade span (40) and the trailing inter-blade span (42).

A4. The razor cartridge (20) according to statement A3, wherein the first intermediate inter-blade span (41) is equal to, or less than, the leading inter-blade span (40).

A5. The razor cartridge (20) according to one of statements A1 to A4, wherein the first intermediate inter-blade span (41) is equal to, or greater than, the trailing inter-blade span (42).

A6. The razor cartridge (20) according to any one of statements A1 to A5, wherein the leading inter-blade span (40) is in the range 1.70 mm to 2.20 mm, more specifically from 1.80 mm to 2.00 mm, and most specifically 1.85 mm.

A7. The razor cartridge (20) according to one of statements A1 to A6, wherein the first intermediate inter-blade span (41) is in the range 1.55 mm to 1.95 mm, more specifically from 1.60 mm to 1.80 mm, and most specifically 1.70 mm.

A8. The razor cartridge (20) according to one of statements A1 to A7, wherein the trailing inter-blade span (42) is in the range 1.4 mm to 1.8 mm, more specifically from 1.50 mm to 1.65 mm, and most specifically 1.55 mm.

A9. The razor cartridge (20) according to any one of statements A3 to A5, wherein one or more of the leading inter-blade span (40), the first intermediate inter-blade span (41), and/or the trailing inter-blade span (42) is in the range 1.6 mm to 2.2 mm, more specifically from 1.70 mm to 2.00 mm, or 1.75 mm to 1.95 mm.

A10. The razor cartridge (20) according to one of statements A3 to A9, comprising:

a fifth substantially parallel cutting member disposed in a shaving direction (S) of the razor cartridge, wherein a second intermediate inter-blade span is defined adjacent to the trailing inter-blade span (42).

A11. The razor cartridge (20) according to one of statements A1 to A10, wherein each of the blade supports (32) comprise a shaving plane contact portion that is configured, in use, to contact the shaving plane (SH) in addition to the cutting edges (30*a*, 30*b*, 30*c*, 30*d*) of the blades, thereby reducing the pressure at cutting edge contact points with the shaving plane.

A12. The razor cartridge (20) according to one of statements A1 to A11, wherein consecutive inter-blade spans (40, 41, 42) of the razor cartridge successively decrease between the leading longitudinal side (24) and the trailing longitudinal side (25) of the razor cartridge in the shaving direction (S).

A13. A method of manufacturing a razor cartridge comprising:

obtaining (74) a razor cartridge housing and three or more cutting members (28*a-d*), wherein each of the cutting members (28*a-d*) comprises a blade support (32) comprising a blade mounting portion (71) disposed on an inner surface (66) of the respective blade support that in use faces away from a shaving plane (SH) and a blade attached to the blade mounting portion; and disposing (76) the cutting members (28*a-d*) between a leading longitudinal side and a trailing longitudinal side of the razor cartridge housing in a shaving direction of the razor cartridge, wherein in use, the inner surface of the respective blade support faces away from a shaving plane (SH);

wherein the cutting members (28*a-d*) define a plurality of inter-blade spans between cutting edges of the blades; and wherein a leading inter-blade span that is closer to the leading longitudinal side of the razor cartridge than a trailing inter-blade span is greater than the trailing inter-blade span that is closer to the trailing longitudinal side of the razor cartridge than the leading inter-blade span.

A14. A shaving razor assembly (1) comprising:

a razor handle (2);

a razor cartridge (20) according to one of statements A1 to A12, wherein the razor cartridge is either releasably attached to the razor handle via a pivotable (8) or non-pivotable connection, integrally formed with the razor handle via a non-pivotable connection, or integrally formed with the razor handle via a pivotable connection.

A15. A kit of parts comprising:

a razor handle; and a razor cartridge holder comprising a plurality of razor cartridges razor cartridge (20) according to one of statements A1 to A12.

B1. A razor cartridge (20) comprising:

three or more substantially parallel cutting members (28*a-d*) disposed between a leading longitudinal side (24) and a trailing longitudinal side (25) of the razor cartridge in a shaving direction (S) of the razor cartridge;

wherein each of the cutting members (28*a-d*) comprises a blade support (32) comprising a blade mounting portion (71) disposed on an inner surface (66) of the respective blade support that, in use, faces away from a shaving plane (SH), and a blade (33) attached to the blade mounting portion (71);

wherein the cutting members (28*a-d*) are disposed to define a plurality of inter-blade spans (40, 41, 42) between cutting edges (30) of the blades; and wherein a leading inter-blade span (40) that is closer to the leading longitudinal side (24) of the razor cartridge than a trailing inter-blade span (42) is smaller than the trailing inter-blade span (42) that is closer to the trailing longitudinal side (25) of the razor cartridge than the leading inter-blade span.

B2. A razor cartridge (20) according to statement B1, further comprising:

first and second debris run-off portions (46, 47) arranged at least in correspondence with the trailing inter-blade span (40) and the leading inter-blade span (42), respectively, wherein the first debris run-off portion (46) is dimensioned to conduct relatively more debris than the second debris run-off portion (47) out of the respective leading or trailing longitudinal inter-blade spans (40, 42) during shaving and/or rinsing.

B3. The razor cartridge (20) according to any one of statements B1 or B2, comprising:

a fourth substantially parallel cutting member disposed between the leading (24) and trailing (25) longitudinal sides of the razor cartridge in the shaving direction (S) of the razor cartridge, wherein a first intermediate inter-blade span (41) is further defined between the leading inter-blade span (40) and the trailing inter-blade span (42).

B4. The razor cartridge (20) according to statement B3, wherein the first intermediate inter-blade span (41) is equal to, or greater than, the leading inter-blade span (40).

B5. The razor cartridge (20) according to one of statements B1 to B4, wherein the first intermediate inter-blade span (41) is equal to, or smaller than, the trailing inter-blade span (42).

B6. The razor cartridge (20) according to any one of statements B1 to B5, wherein the trailing inter-blade span (40) is in the range 1.70 mm to 2.20 mm, more specifically from 1.80 mm to 2.00 mm, and most specifically 1.85 mm.

B7. The razor cartridge (20) according to one of statements B1 to B6, wherein the first intermediate inter-blade span (41) is in the range 1.55 mm to 1.95 mm, more specifically from 1.60 mm to 1.80 mm, and most specifically 1.70 mm.

B8. The razor cartridge (20) according to one of statements B1 to B7, wherein the leading inter-blade span (42) is in the range 1.4 mm to 1.8 mm, more specifically from 1.50 mm to 1.65 mm, and most specifically 1.55 mm.

B9. The razor cartridge (20) according to one of statements B3 to B5, wherein one or more of the leading inter-blade span (40), the first intermediate inter-blade span (41), and/or the trailing inter-blade span (42) is in the range 1.6 mm to 2.2 mm, more specifically from 1.70 mm to 2.00 mm, or 1.75 mm to 1.95 mm.

B10. The razor cartridge (20) according to one of statements B3 to B9, comprising:
a fifth substantially parallel cutting member disposed in a shaving direction (S) of the razor cartridge, wherein a second intermediate inter-blade span is defined adjacent to the trailing inter-blade span (42).

B11. The razor cartridge (20) according to one of statements B1 to B10,
wherein each of the blade supports (32) comprise a shaving plane contact portion that is configured, in use, to contact the shaving plane (SH) in addition to the cutting edges (30*a*, 30*b*, 30*c*, 30*d*) of the blades, thereby reducing the pressure at cutting edge contact points with the shaving plane.

B12. The razor cartridge (20) according to one of statements B1 to B11,
wherein consecutive inter-blade spans (40, 41, 42) of the razor cartridge successively increase between the leading longitudinal side (24) and the trailing longitudinal side (25) of the razor cartridge in the shaving direction (S).

B13. A method of manufacturing a razor cartridge comprising:
obtaining (74) a razor cartridge housing and three or more cutting members (28*a-d*), wherein each of the cutting members (28*a-d*) comprises a blade support (32) comprising a blade mounting portion (71) disposed on an inner surface (66) of the respective blade support that in use faces away from a shaving plane (SH) and a blade attached to the blade mounting portion; and
disposing (76) the cutting members (28*a-d*) between a leading longitudinal side and a trailing longitudinal side of the razor cartridge housing in a shaving direction of the razor cartridge, wherein in use, the inner surface of the respective blade support faces away from a shaving plane (SH);
wherein the cutting members (28*a-d*) define a plurality of inter-blade spans between cutting edges of the blades; and
wherein a leading inter-blade span that is closer to the leading longitudinal side of the razor cartridge than a trailing inter-blade span is smaller than the trailing inter-blade span that is closer to the trailing longitudinal side of the razor cartridge than the leading inter-blade span.

B14. A shaving razor assembly (1) comprising:
a razor handle (2);
a razor cartridge (20) according to one of statements B1 to B12, wherein the razor cartridge is either releasably attached to the razor handle via a pivotable (8) or non-pivotable connection, integrally formed with the razor handle via a non-pivotable connection, or integrally formed with the razor handle via a pivotable connection.

B15. A kit of parts comprising:
a razor handle; and
a razor cartridge holder comprising a plurality of razor cartridges razor cartridge (20) according to one of statements B1 to B12.

C1. A razor cartridge comprising:
a first blade support and a second blade support, each of the first and second blade supports include a flat portion having an inner surface which in use faces away from a shaving surface S;
a first blade attached to the inner surface of the flat portion of the first blade support, wherein the first blade includes a first cutting edge; and
a second blade attached to the inner surface of the flat portion of the second blade support, wherein the second blade includes a second cutting edge; wherein
a distance between the first and second cutting edges is within a range of 1.6 mm to 2.2 mm.

C2. The razor cartridge of statement C1, wherein the distance between the first and second cutting edges is within a range of 1.70 mm to 2 mm.

C3. The razor cartridge of statements C1 or C2, wherein the distance between the first and second cutting edges is within a range of 1.75 mm to 1.95 mm.

C4. The razor cartridge of any one of the preceding statements C1-C3, wherein each of the first and second blade support includes a front end configured to contact skin.

C5. The razor cartridge of any one of the preceding statements C1-C4, wherein at least one front end is rounded.

C6. The razor cartridge of any one of the preceding statements C1-C5, wherein each of the first and second blade support includes a base portion extending at an angle β from the flat portion, the angle β formed between the flat portion and the base portion of the respective first and second blade supports being within a range of 104° to 120°.

C7. The razor cartridge of any of statements C1-C6, further comprising a third blade support, the third blade support including a flat portion having an inner surface which faces away from the shaving surface S;
a third blade attached to the inner surface of the flat portion of the third blade support, wherein the third blade includes a third cutting edge; wherein
a distance between the second to the third cutting edges is within a range of 1.6 mm to 2.2 mm.

C8. The razor cartridge of statement C7, wherein the distance between the second to the third cutting edges is within a range of 1.70 mm to 2 mm.

C9. The razor cartridge of according to any one of statements C7 or C8, wherein the distance between the second to the third cutting edges is within a range of 1.75 mm to 1.95 mm.

C10. The razor cartridge of any of statements C7-C9, further comprising a fourth blade support, the fourth blade support including a flat portion having an inner surface which faces away from the shaving surface;
a fourth blade attached to the inner surface of the flat portion of the fourth blade support, wherein the fourth blade includes a fourth cutting edge; wherein
a distance between the third to the fourth cutting edges is within a range of 1.6 mm to 2.2 mm.

C11. The razor cartridge of statement C10, wherein the distance between the third to the fourth cutting edges is within a range of 1.70 mm to 2 mm.

C12. The razor cartridge according to one of statements C10 or C11, wherein the distance between the third to the fourth cutting edges is within a range of 1.75 to 1.95.

C13. The razor cartridge of any one of statements C7 to C12, wherein the third and/or fourth blade supports include a front end that is configured to contact skin.

C14. The razor cartridge of statement C13, wherein at least one front end is rounded.

C15. A shaver comprising a handle and a razor cartridge according to any of statements C1-C14, the razor cartridge being connectable to the handle, wherein the razor cartridge comprises four blade assemblies, wherein the distance between consecutive cutting edges is 1.85 mm±0.1 mm.

REFERENCE NUMERALS

S Shaving direction
SH Shaving plane
L Longitudinal direction
IBS inter blade span
RO inner radius of curvature
T1 Razor blade thickness
T2 Blade support thickness
1 Shaving razor assembly
2 Handle
4 proximal portions
5*a*, 5*b* release mechanism
6 distal portion
8 pivotable bearing member
9 handle grips
12 bulging
14 skin contact point
16 first side portion
18 second side portion
20 razor cartridge
21 frame
22 platform member
23 guard member
24 leading longitudinal side
25 trailing longitudinal side
26 first retainer
27 second retainer
28*a-d* cutting member
29 group of cutting members
30*a-d* cutting edge
31*a-d* blade receiving section
32 blade support
33*a-d* blade
34*a-d* holding slots
35 cross member
36 blade support guide
38*a-d* resilient finger
40 leading inter blade span
41 first intermediate inter blade span
42 trailing inter-blade span
43*a-d* cutting edge to blade span
44 leading blade to frame span
45 trailing blade to frame span
46 first debris run-off portion
47 second debris run-off portion
48 third debris run-off portion
49 longitudinal trailing assembly
50 longitudinal skin care element
52 retractable cover
53 trimming blade
54 trimming blade support
55 internal leading longitudinal wall of blade receiving section 31
56 internal trailing longitudinal wall of blade receiving section 31
58 shaving plane contact portion
60 lower portion of blade support
62 radius bend
64 rounded indent
65 top side of blade support member
66 inner surface of blade support
68 outer surface of blade support
70 inner face of blade
71 blade mounting portion
72 rounded front end of blade support
74 obtaining a razor cartridge housing and three or more cutting members . . .
76 disposing the three or more cutting
70 members . . .

The invention claimed is:

1. A razor cartridge comprising:

four cutting members disposed between an internal leading longitudinal wall and an internal trailing longitudinal wall of a blade receiving section of the razor cartridge in a shaving direction of the razor cartridge;

wherein each of the cutting members comprises a blade support comprising a blade mounting portion disposed on an inner surface of the respective blade support that, in use, faces away from a shaving plane, and a blade attached to the blade mounting portion;

wherein the cutting members are disposed to define a plurality of inter-blade spans between cutting edges of the blades, a leading blade to frame span, a trailing blade to frame span, a leading inter-blade span, a trailing inter-blade span, and an intermediate inter-blade span, wherein each of the plurality of inter-blade spans is a distance or space between cutting edges of adjacent cutting members among the cutting members, wherein the leading blade to frame span includes a space between the internal leading longitudinal wall and a cutting edge of a leading cutting member of the cutting members, wherein the trailing blade to frame span includes a space between the internal trailing longitudinal wall and a cutting edge of a trailing cutting member of the cutting members, wherein the leading inter-blade span includes a space that is closest to the internal leading longitudinal wall among the plurality of inter-blade spans, wherein the trailing inter-blade span includes a space that is closest to the internal trailing longitudinal wall among the plurality of inter-blade spans, and wherein the intermediate inter-blade span includes a space provided between the leading inter-blade span and the trailing inter-blade span;

wherein the leading blade to frame span is 0.4 mm to 1.0 mm, wherein the trailing blade to frame span is 1.7 mm to 2.2 mm, wherein at least one of the plurality of inter-blade spans is in a range from 1.55 mm to 1.95 mm, wherein a length of the leading inter-blade span is in a range from 1.40 mm to 2.20 mm, a length of the intermediate inter-blade span is in a range from 1.55 mm to 1.95 mm, and a length of the trailing inter-blade span is in a range from 1.40 mm to 1.80 mm, wherein each of the length of the leading inter-blade span, the length of the intermediate inter-blade span, and the length of the trailing inter-blade span is different from one another, wherein the length of the intermediate inter-blade span is between the length of the leading inter-blade span and the length of the trailing inter-blade span.

2. The razor cartridge of claim 1, wherein each blade support of the respective blade supports comprises a shaving plane contact portion that, during shaving, contacts the shaving plane in addition to the blades, thereby reducing a pressure at cutting edge contact points with the shaving plane.

3. The razor cartridge of claim 2, wherein each blade of the respective blades is positioned a range from 80 um below the shaving plane contact portion to 80 um above the shaving plane contact portion.

4. The razor cartridge of claim 1, wherein each blade support of the respective blade supports has a thickness in a range from 0.12 mm to 0.21 mm.

5. The razor cartridge of claim 1, wherein a span between an end of each blade support of the respective blade supports and each cutting edge of the blade of the respective blade supports is in a range from 0.3 mm to 0.6 mm.

6. The razor cartridge of claim 1, wherein a first blade support of the respective blade supports has at least one of a different thickness or a different tilt angle than a second blade support of the respective blade supports.

7. The razor cartridge of claim 1, wherein an end of each blade support of the respective blade supports is rounded.

8. The razor cartridge of claim 1, further comprising:

a longitudinal skin care element provided to trail the blade receiving section and configured to apply a compound to the skin of the user during shaving.

9. The razor cartridge of claim 1, further comprising:

a longitudinal trimming blade disposed on a trailing longitudinal side of the razor cartridge.

10. The razor cartridge of claim 9, further comprising:

a retractable cover configured to selectively cover the longitudinal trimming blade.

11. A kit of parts comprising:

a razor handle; and a plurality of razor cartridges including the razor cartridge of claim 1.

12. The razor cartridge of claim 1, wherein the length of the leading inter-blade span is longer than the length of the trailing inter-blade span.

13. The razor cartridge of claim 1, wherein the length of the leading inter-blade span is shorter than the length of the trailing inter-blade span.

14. The razor cartridge of claim 1, wherein a difference between the length of the leading inter-blade span and the length of the intermediate inter-blade span is about 0.1 mm.

15. The razor cartridge of claim 14, wherein a difference between the length of the trailing inter-blade span and the length of the intermediate inter-blade span is about 0.1 mm.

16. The razor cartridge of claim 1, wherein a difference between the length of the trailing inter-blade span and the length of the intermediate inter-blade span is about 0.1 mm.

* * * * *